United States Patent
Lee et al.

(10) Patent No.: US 9,973,518 B2
(45) Date of Patent: May 15, 2018

(54) APPARATUS AND METHOD FOR CHECKING MESSAGE AND USER TERMINAL

(71) Applicant: SK TELECOM CO., LTD., Seoul (KR)

(72) Inventors: Yong-hak Lee, Seoul (KR); Ji Hoon Cho, Seoul (KR)

(73) Assignee: SK TELECOM CO., LTD., Seoul (KR)

(*) Notice: Subject to any disclaimer, the term of this patent is extended or adjusted under 35 U.S.C. 154(b) by 264 days.

(21) Appl. No.: 14/882,095

(22) Filed: Oct. 13, 2015

(65) Prior Publication Data

US 2016/0036842 A1 Feb. 4, 2016

Related U.S. Application Data

(63) Continuation of application No. PCT/KR2014/003157, filed on Apr. 11, 2014.

(30) Foreign Application Priority Data

| Apr. 12, 2013 | (KR) | 10-2013-0040639 |
| Jun. 11, 2013 | (KR) | 10-2013-0066346 |
| Oct. 31, 2013 | (KR) | 10-2013-0131442 |

(51) Int. Cl.
*G06F 7/04* (2006.01)
*G06F 15/16* (2006.01)
(Continued)

(52) U.S. Cl.
CPC .......... *H04L 63/1416* (2013.01); *H04L 51/12* (2013.01); *H04L 63/0227* (2013.01);
(Continued)

(58) Field of Classification Search
CPC . H04L 63/08; H04L 63/0227; H04L 63/1416; H04L 63/1425; H04L 51/12; H04L 51/18
(Continued)

(56) References Cited

U.S. PATENT DOCUMENTS 8,201,247 B1 * 6/2012 Chen ............... G06F 21/564
726/22
8,359,651 B1 * 1/2013 Wu ............... G06F 17/30867
709/224

(Continued)

FOREIGN PATENT DOCUMENTS

AU 2007273085 B2 * 7/2012 ....... G06F 17/30864
KR 1020030012556 A 2/2003
(Continued)

OTHER PUBLICATIONS

URL:http://blog.naver.com/repairing112/60106932804 with Concise explanation of relevance (Publication date: May 9, 2010).
(Continued)

*Primary Examiner* — Saleh Najjar
*Assistant Examiner* — Feliciano S Mejia
(74) *Attorney, Agent, or Firm* — Hauptman Ham, LLP

(57) ABSTRACT

A message checking apparatus comprising one or more processors, the message checking apparatus includes: a uniform resource locator(URL) extracting unit to check, when a message is received, whether a URL is included in the message and extract the URL from the message; a communication unit to download an application using the URL; and an authorization/application program interface (API) verifying unit to check whether an authorization or API having a security risk is included in the application to be downloaded through the communication unit and then determine whether the URL is malicious based thereon.

17 Claims, 18 Drawing Sheets

(51) Int. Cl.
   *G06F 17/30*     (2006.01)
   *H04L 29/06*     (2006.01)
   *H04L 12/58*     (2006.01)
(52) U.S. Cl.
   CPC .......... *H04L 63/08* (2013.01); *H04L 63/1425* (2013.01); *H04L 51/18* (2013.01)
(58) Field of Classification Search
   USPC ............................................................. 726/4
   See application file for complete search history.

(56) References Cited

U.S. PATENT DOCUMENTS

| | | | |
|---|---|---|---|
| 8,832,836 B2 * | 9/2014 | Thomas ................ | G06F 21/566 726/24 |
| 9,158,918 B2 * | 10/2015 | Li ........................... | G06F 21/56 |
| 2006/0271396 A1 | 11/2006 | Lee et al. | |
| 2007/0249374 A1 | 10/2007 | Hu et al. | |
| 2009/0049130 A1 | 2/2009 | Plooij et al. | |
| 2011/0296179 A1 * | 12/2011 | Templin ................ | H04L 9/0869 713/168 |
| 2012/0324568 A1 * | 12/2012 | Wyatt .................... | G06F 21/51 726/13 |
| 2014/0130161 A1 * | 5/2014 | Golovanov ........... | G06F 21/564 726/23 |

FOREIGN PATENT DOCUMENTS

| | | |
|---|---|---|
| KR | 1020050000015 A | 1/2005 |
| KR | 100482538 B1 | 4/2005 |
| KR | 100606748 B1 | 7/2006 |
| KR | 1020070091114 A | 9/2007 |
| KR | 1020080012402 A | 2/2008 |
| KR | 1020090008247 A | 1/2009 |
| KR | 1020100059185 A | 6/2010 |
| KR | 1020140112730 A | 9/2014 |

OTHER PUBLICATIONS

International Search Report dated Jul. 24, 2014 for PCT/KR2014/003157.

* cited by examiner

FIG. 10 conversation   received   tranmitted

| | | 400 ~ | |
|---|---|---|---|
| | 15770700 | | AM 10:32 |
| | Title: [FW] CHINAFACTORY ... | | |
| | 031763387 | 400 ~ | AM 10:32 |
| | Good Morning, .. | | |
| | 01039499110 | | AM 6:45 |
| | [Express] 3.21 (Thursday,....) | | |
| | 01087420098 | | 03:20 |
| | [FW] No Title | | |
| | 15991155 | | 03:20 |
| | HanaSK Card [1*0*], .... | | |
| | Park Hyun-Chul,.... | | 03:20 |
| | 01031968353 | | 03:20 |
| | There is no specific point.... | | |

01039499110

[Express]
19 March (Tue)
Cloudy
starting normally from garage
03/19, AM 06:35                 400

[Express]
20 March (Wed)
Foggy
starting normally from garage
03/20, AM 06:48                 400

[Express]
21 March (Thu)
Sunny
starting normally from garage
03/21, AM 06:45                 400

FIG.13

APPARATUS AND METHOD FOR CHECKING MESSAGE AND USER TERMINAL

CROSS-REFERENCE TO RELATED APPLICATIONS

The present application is a continuation of International Patent Application No. PCT/KR2014/003157, filed Apr. 11, 2014, which is based upon and claims the benefit of priorities to Korean Patent Application No. 10-2013-0040639, filed on Apr. 12, 2013, Korean Patent Application No. 10-2013-0066346, filed on Jun. 11, 2013, and Korean Patent Application No. 10-2013-0131442, filed on Oct. 31, 2013. The disclosures of the above-listed applications are hereby incorporated by reference herein in their entirety.

TECHNICAL FIELD

The present disclosure relates to a message service using a communication network, and more particularly, to an apparatus and a method for checking messages and a user terminal for a use in processing the messages transmitted by a message service.

BACKGROUND

The statements in this section merely provide background information related to the present disclosure and do not constitute prior art.

Recently, a user terminal such as mobile phones, smart phones, or etc. has become necessities in human life and is used by people regardless of age or gender. Service providers and terminal manufacturers make effort to be prominent from other competitors.

The user terminal has been developed as a multimedia device providing several functions of saving a phone book, playing a game, texting, sending and receiving an e-mail, ringing a morning call, playing MP3 (MPEG Audio Layer 3), a digital camera and using a wireless Internet service to a user.

Meanwhile, since the texting function among the above functions of the user terminal is relatively cheaper than a voice call, many users are using the texting function.

The message, for example, is SMS (Short Messaging Service), MMS (Multimedia Messaging Service), and a packet-based message. The SMS refers to a message service by which a simple text message is transmissible, and the MMS refers to a message service by which a message including a video file, a picture file, a music file, and the simple text is sendable. In addition, the packet-based message is a message to be transmitted through a packet based network. Users have a conversation with text message parsed and transmitted in a type of the packet-based message. A video file, a picture file, or a music file like MMS are also allowed to be transmitted in the type of the packet-based message.

However, the inventor(s) has noted that recently a number of companies or unspecific people are making use of the above functions such as SMS/MMS message function, etc. for advertisements of them; thus, a user becomes uncomfortable due to the reception of many unnecessary messages. In addition, the inventor(s) has noted that spam messages such as a gambling advertisement message or an obscene message etc. from abnormal companies are also problematic.

Further, the inventor(s) has noted that there is a spam (smishing) message in which a malicious URL is inserted, among messages such as SMS messages, MMS messages or packet-based messages, etc. that have been transmitted to the user terminal for a purpose of an announcement, an advertisement or an advertisement of a company, an advertising person, etc.

The inventor(s) has experienced that in this case, when the user clicks it, the spam message including the malicious URL causes to the user a damage that an application including a malicious code is installed in a user terminal or the user accesses a web site of smishing enterprise located abroad. Accordingly, the inventor(s) has noted that such a potential danger to be caused by a malicious URL is required to be prevented. The inventor(s) has noted that for example, the damage might be prevented by blocking a transmission of a message including the malicious URL among the messages being transmitted to a user terminal or by alerting a risk of the malicious URL to the user terminal when the message is transmitted to the user terminal.

Meanwhile, the inventor(s) has noted that as a known method to prevent damage caused by the above malicious URL, there has been provided a spam filtering system or SMSC (short message service center) filtering an abnormal message causing a malicious application to be installed by detecting the abnormal message based on pattern-searching in the message. However, the inventor(s) has experienced that the number of patterns to be detected by the pattern-searching is highly limited, and therefore, the filtering performance is not enough to filter out many kinds of malicious URLs, since patterns registered as malicious are obtainable by receiving a report regarding the malicious URL from a user and analyzing it.

In addition, the inventor(s) has noted that another method has been suggested by a security software provider. The inventor(s) has noted that according to the another method, it leaks personal information through several testing terminals, and then collects all messages trying to propagate malicious application and obtain full descriptions of the messages. However, the inventor(s) has noted that since a hundred of variant malicious applications that aim to obtain personal information of the user are found for a week and a number of obtainable malicious applications are limited, the performance of the another method also is not sufficient.

SUMMARY

In accordance with an embodiment of the above mentioned present disclosure, a message checking apparatus comprising one or more processors, includes a uniform resource locator (URL), a communication unit and an authorization/application program interface (API) verifying unit. The URL (Uniform Resource Locator) extracting unit is configured to check, when a message is receive, whether a URL is included in the message and extract the URL from the message. The communication unit is configured to download an application using the URL. And the authorization/API (Application Program Interface) verifying unit is configured to check whether an authorization or API having a security risk is included in the application downloaded through the communication unit and then determine whether the URL is malicious based thereon.

In accordance with an embodiment of the present disclosure, a message checking method is implemented by the processor of the message checking apparatus. The processor of the message checking apparatus implements: checking, when a message is received, whether a uniform resource locator (URL) is included in the message to extract the URL; downloading an application using the URL; and checking whether an authorization or application program interface (API) having a security risk is included in the downloaded application to determine whether the URL is malicious.

In accordance with an embodiment of the present disclosure, a message checking apparatus comprising at least one processor includes a communication unit, an authenticating unit and a processing unit. The communication unit is configured to receive a message transmitted from a message provider. The authenticating unit is configured to check whether the message is normal. And the processing unit is configured to include in the message information regarding whether the message is normal based on a result of the check.

In accordance with an embodiment of the present disclosure, a message checking method implemented by at least one processor of the message checking apparatus. The processor is configured to implement the method comprising: receiving a message transmitted from a message provider, checking whether the message is normal and including information regarding whether the message is normal to be included in the message based on a result of said checking.

In accordance with an embodiment of the present disclosure, a user terminal including one or more processors comprises a communication unit, an authenticating unit and a controller. The communication unit is configured to receive a message through a communication network. The authenticating unit is configured to check whether the message is normal by extracting information, included in the message, on whether the message is normal. And the controller is configured to notify whether the message is normal based a result of the check.

BRIEF DESCRIPTION OF THE DRAWINGS

FIGS. 10 to FIG. 12 are diagrams separately illustrating authenticated messages on a message condensed window in accordance with other exemplary embodiments of the present disclosure.

FIG. 13 is a diagram illustrating a URL risk on a message condensed window in accordance with at least one embodiment of the present disclosure.

DETAILED DESCRIPTION

Figure 1:
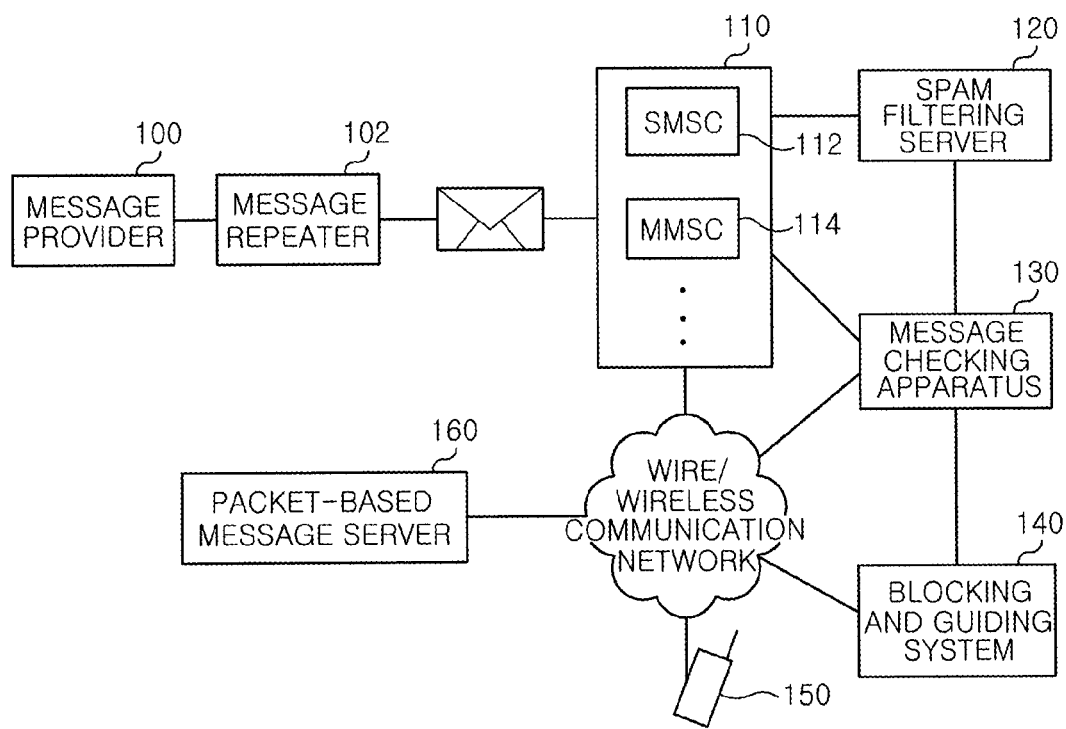
FIG. 1 is a diagram of a communication network for transmitting messages including a message checking apparatus to which at least one embodiment of the present disclosure is applied.

Hereinafter, example embodiments of the present disclosure will be described in detail with reference to the accompanying drawings. Throughout the drawings, like or similar elements are referred to like numerals. In the following description, well-known functions and/or constitutions will not be described in detail if they would unnecessarily obscure the features of the disclosure. Further, the terms to be described below are defined in consideration of their functions in the embodiments of the disclosure and varies depending on a user's or operator's intention or practice. Accordingly, the definition is made on a basis of the content throughout the specification. FIG. 1 is a diagram of a communication network for transmitting messages including a message checking apparatus to which the present disclosure is applied. Hereinafter, with reference to FIG. 1, an operation in each component in the communication network for transmitting messages will be described in detail.

Firstly, a message provider 100 means the entity sending a message such as SMS (Short Message Service), MMS (Multimedia Message Service) message or a packet-based message, etc. to a user terminal 150 connected to wire/wireless communication networks, etc. including mobile communication networks. The user terminal 150 refers to a mobile communication terminal device (i.e., a user terminal device or a user equipment (hereinafter referred to as "user terminal")) such as a mobile phone, a smart phone, or the like general wire/wireless telephone including a display window capable of receiving a message, and a PC (personal computer), laptop computer, tablet, PDA (personal digital assistant), game console, PMP (portable multimedia player), PSP (PlayStation Portable), TV, media player, and the like. The user terminal 150 according to one or more embodiments includes various devices or elements, each including (i) a communication device such as a communication modem or the like for performing communications with various types of devices, wired/wireless communication networks (e.g., the Internet, wireless personal area network (WPAN), wireless local area network (WLAN), WiBro (wireless broadband, aka WiMax) network), or mobile communication networks and the like or through various communication interfaces such as a cable, a universal serial bus (USB) and the like, (ii) a memory for storing various programs and data that perform various functions, and (III) a microprocessor to execute a program so as to perform calculation, operation and control, and the like. The message is, for example, an MMS message, SMS message or a packet-based message being transmitted through various messengers using a packet networks.

This message provider 100, for example, is a server managed or operated by a company or an unspecific person such as financial services, manufacturers, open markets, etc. In addition, a message sent by the message provider 100, for example, is a message including an announcement, a promotion or an advertisement that is related to the relevant company.

A message repeater 102 generates a message of content corresponding to a message sending request when the message provider 100 receives the message sending request from a company or an unspecific person such as financial services, manufacturers, open markets, etc. to the user terminal of the user who is a target, and transmits the generated message to a message transmission server 110 in the communication network. That is, the message repeater 102 receives information such as data having the same content as it of the message that will be transmitted from the message provider 100 and a mobile identification number (MIN) of the user terminal 150 of the target user that the relevant message should be transmitted, configures a message, and then transmits it to the message transmission server 110 in the communication network.

The message transmission server 110 is a server that transmits a message sent from the message provider 100 to the user terminal 150 that requests the message. For example, the message transmission server 110 is short messaging service center (SMSC) 112, multimedia messaging service center (MMSC) 114 and transmits the message to the user terminal 150.

A packet-based message server 160 is a server operated in a messenger, which serves to transmit a packet-based message to the user terminal through a packet network.

Meanwhile, as described above, when the message including malicious URL causes damage to a user by enabling an application including the malicious URL to be installed or enabling a smishing server in abroad to be connected when the user clicks the relevant message.

Accordingly, according to embodiments of the present disclosure, before transmitting the relevant message to the user terminal 150 that requests the message if the message includes the URL, the transmission server 110 determines whether the URL included in the relevant message is malicious through the message checking apparatus. Thereafter, the transmission server 110 blocks a transmission of a message including the malicious URL among the messages being transmitted to a user terminal, or alerts a risk of the malicious URL to the user terminal, whereby it is possible to reduce a damage caused by malicious URL.

Specifically, when the message checking apparatus 130, for example, as shown in FIG. 1, is connected with the message transmission server 110 such as the SMSC 112, MMSC 114 and receives a message from the SMSC 112, after receiving the message from SMSC 112, the message checking apparatus 130 determines whether a message requested by the user terminal 150 is normal by determining whether a URL included in the message is a normal URL or a malicious URL having malicious intention.

Further, the message checking apparatus 130, which is connected to the packet-based message server 160 operated by various messengers, checks whether a URL included in a packet-based message is malicious. If or when the URL is malicious, the message checking apparatus 130 provides information of a malicious URL to a blocking and guiding system 140 and causes it to be registered in a harmful site list managed by the blocking and guiding system 140. Accordingly, even though the user clicks the relevant malicious URL, the blocking and guiding system 140 blocks an access to the relevant URL, or alerts a risk of the URL; therefore, it is possible to avoid damage by the malicious URL.

Hereinafter, an operation to check a malicious URL by the message checking apparatus 130 will be described in detail.

Firstly, after extracting URL information included in a message, the message checking apparatus 130 compares it with a malicious list and then determines whether the URL extracted from the message through a pre-filtering by the comparison is a malicious URL. If or when it is determined as a malicious URL, the message checking apparatus 130 makes the relevant message not be transmitted to the user terminal 150 by providing this determination to the message transmission server 110, or alerts a risk of the URL. Further, when a malicious URL is included in a packet-based message, the message checking apparatus 130 transmits information of the relevant malicious URL to the blocking and guiding system 140, thereby blocking an access to the relevant URL or be alerted.

In this regard, the malicious URL list means list information of URLs determined as a malicious URL according to the checking result previously processed in the message checking apparatus 130. The message checking apparatus 130 has this malicious URL list, and URL information determined as a malicious URL in the process of the URL check by the message checking apparatus 130 is periodically updated.

Next, the message checking apparatus 130 determines whether the URL is malicious through a vaccine check, an authorization/API check, or a dynamic analysis when it is difficult to determine whether the URL is malicious through the pre-filtering.

In this case, in a method for determining whether the URL is malicious through the vaccine check, the authorization/API check, and the dynamic analysis, the message checking apparatus 130 has an access to a web server (not shown) having a linked URL address through wire/wireless communication networks when it is difficult to determine whether the URL is malicious through the pre-filtering, and then determines whether the URL is malicious by checking whether the application downloaded through the access to the relevant URL is malicious.

In detail, firstly, the message checking apparatus 130 checks whether the relevant application is malicious by comparing the downloaded application with signature information in the previously checked application and checking whether the application is the same. In this case, the message checking apparatus 130 determines the relevant URL to a malicious URL if or when the application is checked as the malicious application through comparing the signature information and the application, and also determines the relevant URL as a normal URL if or when the application is checked as a normal application. In this regard, the signature information, for example, is a hash code such as SHA-256, MD5, etc.

Next, when the downloaded application is an application that has never been checked before, the message checking apparatus 130 checks whether the application is malicious by using a vaccine engine that is prepared in advance. The vaccine engine, for example, is a commercial vaccine engine provided from a vaccine company, and the message checking apparatus 130 determines the relevant URL to a malicious URL if or when the downloaded application is checked as a malicious application. However, a check whether the application is malicious by using the vaccine engine is not an accurate check with regard to an application having a variant pattern not included in the vaccine engine.

Accordingly, the message checking apparatus 130 additionally performs an authorization/API check, a dynamic analysis, etc. with regard to an application that is not determined as a malicious application through a vaccine engine.

In other words, the message checking apparatus 130 analyzes an execution file of the application that is not checked whether the application is malicious through a vaccine engine and then checks authorization information in the application.

This authorization information is a record on information regarding an authorization capable of performing in a user terminal 150 when the application is installed in the user terminal. A malicious application, for example, has an authorization having a security risk such as "message reading", "conversation content stealing" etc. capable of leaking personal information of the user. In addition, the authorization information is recorded in, for example, 'AndroidManifest.xml' file in case that the application is made on a basis of Android operating system.

Accordingly, the message checking apparatus 130 determines the relevant URL to a malicious URL if or when it is checked that the downloaded application has an authorization of security risk through the authorization check. In this case, the authorization capable of determining a malicious URL is differently set according to a policy.

Further, when the application has an authorization of security risk that could be determined as a malicious URL, the message checking apparatus 130 decompiles an execution file of the relevant application through an API check. After that, the message checking apparatus 130 determines the relevant URL to a malicious URL if or when an API necessary for performing the authorization is really written to be called.

In addition to the authorization/API check, the message checking apparatus 130 performs a more secure method of a dynamic analysis to check whether the relevant application is malicious by really executing it on the emulator. The relevant URL is determined to a malicious URL if or when an analyzed result of the really executed application is checked as a malicious action.

Next, if or when it is checked that the URL included in the message that is requested by the user terminal 150 through the method explained as the above is a malicious URL, the message checking apparatus 130 notifies information that the relevant message is an abnormal message to the message transmission server 110, causing it to block the abnormal message to be transmitted to the user terminal 150. Otherwise, when the message is transmitted, the message checking apparatus 130 allows the user terminal 150 to display alert information notifying that the relevant message including malicious URL is a dangerous message; to thereby avoid a damage caused by the abnormal message.

In addition, in preparation for transmitting a malicious URL inducing a download of the malicious application through a different route in the communication network such as a messenger using the packet-based message server 160, besides a message service of SMS, MMS, etc., to the user terminal, the message checking apparatus 130 provides URL information determined to a malicious URL to the blocking and guiding system 140 in the communication network, so that the URL information is updated periodically.

The blocking and guiding system 140 is provided with information regarding harmful sites that distributes malicious applications capable of causing damage to the user terminal. Therefore, the blocking and guiding system 140 blocks an access to the harmful sites and provide a guide page regarding riskiness if or when the user terminal 150 intends to access the relevant harmful site.

Accordingly, since the message checking apparatus 130 provides information regarding malicious URLs to the blocking and guiding system 140, and periodically updates it, even though malicious URL is transmitted to the user terminal 150 through different route (for example, a text messaging application such as a messenger) in the communication network besides a message service of SMS, MMS, etc. and the message including the malicious URL is not previously blocked or alerted, the user terminal 150 to access the relevant malicious URL is blocked by the blocking and guiding system 140.

Figure 4:
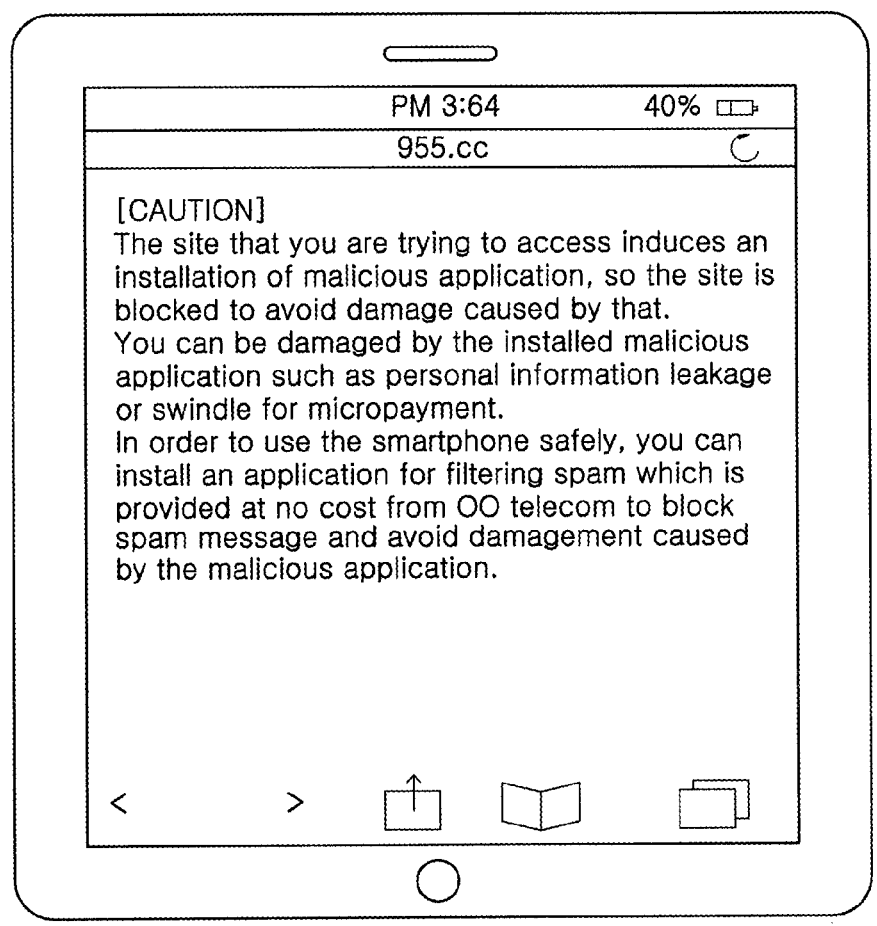
FIG. 4 is a presentation of an access block guiding message display due to a malicious URL in accordance with at least one embodiment of the present disclosure.

For example, when the blocking and guiding system 140 blocks the user terminal 150 to access the relevant URL by using malicious URL information provided from the message checking apparatus 130, the blocking and guiding system 140 transmits a blocking guide message, as shown in FIG. 4, to the user terminal, so that the user recognizes it.

Meanwhile, in the message checking apparatus 130 described above, even though it is described that after the message checking apparatus 130 directly receives the message from the message transmission server 110 and extracts the URL from the message, it determines whether the extracted URL is malicious, the operation is performed as described above in cooperation with the spam filtering server 120.

Hereinafter, an operation for determining whether a message including a URL is an abnormal message or not in corporation of the message checking apparatus 130 with the spam filtering server 120 will be described in detail.

Firstly, the spam filtering server 120 refers to a server that checks whether various typed messages being transmitted to the user terminal 150 through the message transmission server 110 is a spam message by comparing them with a pre-stored filtering pattern.

Accordingly, in accordance with an embodiment of the present disclosure, the spam filtering server 120 is configured to extract a URL from the message including the URL while performing the spam message filtering function, and request for the message checking apparatus 130 to check whether the relevant message is malicious. Further, when the URL notified from the message checking apparatus 130 is a malicious URL, the spam filtering server 120 is configured to notify to the message transmission server 110 that the message including a malicious URL is an abnormal message so that the relevant message needed not be transmitted to the user terminal 150.

Upon receiving a request from the spam filtering server 120 to determine whether the URL is malicious, the message checking apparatus 130 determines whether the relevant URL is malicious through the same method as described above and then provides the result to the spam filtering server 120.

Moreover, when determining whether the URL included in the received new message is malicious based on list information of the relevant URLs as a filtering pattern if the URL is determined to a malicious URL from the message checking apparatus 130, the spam filtering server 120 determines whether the URL is malicious by comparing it with the malicious URL list before requesting the determination to the message checking apparatus 130. Such malicious URL list is periodically updated through interworking with the message checking apparatus 130.

Figure 2:
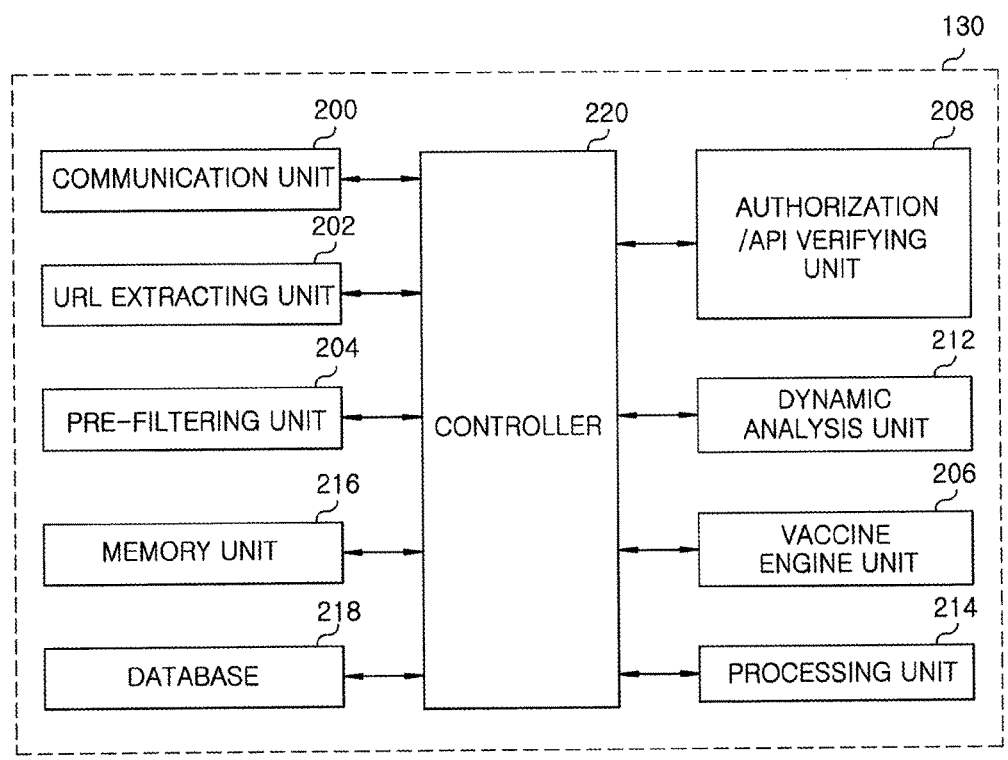
FIG. 2 is a detailed block diagram of a message checking apparatus in accordance with at least one embodiment of the present disclosure.

FIG. 2 is a detailed block diagram of the message checking apparatus in accordance with an embodiment of the present disclosure. The message checking apparatus includes a communication unit 200, a URL extracting unit 202, a pre-filtering unit 204, a vaccine unit 206, an authorization/API verifying unit 208, a dynamic analysis unit 212, a processing unit 214, a memory unit 216, a data base 218, and a controller 220. Each of the communication unit 200, the URL extracting unit 202, the pre-filtering unit 204, the vaccine unit 206, the authorization/API verifying unit 208, the dynamic analysis unit 212, the processing unit 214 and the controller 220 is implemented by, or includes, one or more processors and/or application-specific integrated circuits (ASICs) specified for respectively corresponding operations and functions described herein. Each of the memory unit 216 and a data base 218 includes at least one non-transitory computer readable medium.

Hereinafter, an operation of each component in the message checking apparatus 130 of the present disclosure will be described in detail with reference to FIG. 2.

Firstly, the communication unit 200 performs data transmission/reception with the message transmission server 110 or the packet-based message server 160 such as the SMSC 112 and MMSC 114 and performs data transmission/reception with a web server and the blocking and guiding system 140 in the communication network via a communication network such as the Internet.

When a message to be requested for transmitting to the user terminal 150 is received by the transmission server 110, or the message is received through the packet-based message server 160, the URL extracting unit 202 checks whether a URL is included in the message. In case where the message includes the URL, the URL extracting unit 202 extracts the relevant URL. The pre-filtering unit 204 determines whether the URL extracted from the message is a malicious URL by performing the pre-filtering through comparing with the malicious URL list with regard to the URL extracted from the URL extracting unit 202. In case of determining the extracted URL to a malicious URL, the pre-filtering unit 204 provides information on the determination of a malicious URL to the controller 220. In response, the controller 220 provides information on the determination of a malicious URL to the message transmission server 110 and does the relevant message not transmitted to the user terminal 150. In addition, when a malicious URL is included in the message transmitted through a messenger, the controller provides information on the determination of a malicious URL to the blocking and guiding system 140 and causes the blocking and guiding system 140 to block the user terminal 150 to be access to the relevant malicious URL.

As described above, the malicious URL list means list information of URLs determined to a malicious URL according to the check performed beforehand in the message checking apparatus 130. The malicious URL list is stored in the data base 218, and then URL information determined to malicious URL during a malicious URL checking process is periodically updated.

The vaccine engine unit 206 checks whether the application downloaded through a URL connection is a malicious application by using a prepared vaccine engine, and then provides the result to the controller 220. The vaccine engine, for example, is a commercial vaccine engine available from a vaccine company.

The authorization/API verifying unit 208 analyzes an execution file of the application and checks authorization information of the application. If an authorization having a risk of security is set in the application, the authorization/API verifying unit 208 determines it to a malicious URL and provides the result to the controller 220. This authorization information is a record on information regarding an authorization capable of performing by a user terminal 150 when the application is installed in the user terminal. For example, the malicious application has an authorization having a security risk such as "message reading", "conversation content stealing" etc. capable of leaking personal information of the user.

Further, the authorization/API verifying unit 208 decompiles and analyze an execution file of the application while performing the authorization check, determine whether the URL is a malicious URL by checking that an API is performed to be really called. That is, for example, the authorization/API verifying unit 208 determines to a malicious URL if an API is performed to be really called, and if not, it also determines to a normal URL.

The dynamic analysis unit 212 checks whether an application is malicious by performing a dynamic analysis really executing and analyzing the application on an emulator. That is, the dynamic analysis unit 212 really executes the application on the emulator and then analyzes an action of the application. If it is analyzed that a malicious action is being performed, the dynamic analysis unit determines the application as a malicious URL and provides the determination result to the controller 220.

As such, when the URL included in a message is verified to a malicious URL through the URL analysis, the processing unit 214 generates URL verifying information notifying a malicious URL and processes the generated URL verifying information to be included in the message. In this case, the processing unit 214, for example, adds the URL verifying information to certain area in a header or data area in the message. Thus, the user terminal 150 such as a mobile communication terminal reads the URL verifying information from a pre-arranged area in the message and check whether the message is normal or not, and then, display information regarding whether a URL included in the message is malicious together with the message, which results in that the user recognizes in advance the risk of the URL.

The memory unit 216 stores an operational program for an overall operation of the message checking apparatus 130, and the controller 220 controls the overall operation of the message checking apparatus 130 under the control of the operational program stored in the memory unit 216.

More specifically, the controller 220 determines whether the URL is malicious URL or not by the pre-filtering through comparing with the malicious URL list by using the pre-filtering unit 204. If it is determined that the URL is a malicious URL, the controller provides information on a malicious URL to the blocking and guiding system 140 and blocks the user terminal 150 to be accessed to the relevant malicious URL, which has been transmitted through a messenger.

As set forth above, the malicious URL list refers to list information of URLs that are determined to a malicious URL according to the check result performed in the message checking apparatus 130 before. The URL information determined to a malicious URL during the checking process is periodically updated.

Further, when there exists the URL that has not been accurately determined whether the URL is a malicious URL through pre-filtering, the controller 220 determines whether the URL is a malicious URL through a vaccine check by using the vaccine engine unit 206, an authorization/API check by using the authorization/API verifying unit 208, and a dynamic analysis by using the dynamic analysis unit 212.

In determining whether the URL is a malicious URL through the vaccine check, the authorization/API check, and the dynamic analysis, the controller 220 accesses in advance to the relevant URL through the communication network and then determine whether the URL is a malicious URL through checking whether an application being downloaded in accessing the relevant URL is malicious.

To do it, the controller 220 compares the application with signature information in the previously checked application, determine the relevant URL to malicious URL if the relevant application is checked to a malicious application, and determine the relevant URL to a normal application if the relevant application is checked to a normal application. In this case, the signature information, for example, is hash code information such as SHA-256, MD5, or the like.

Next, when the downloaded application is an application that has never been checked before, the controller 220 controls the vaccine engine unit 206 to cause it to checks whether the downloaded application is a malicious application by using a vaccine engine installed in the vaccine engine unit 206. The controller determines the relevant URL to a malicious URL if the downloaded application is checked to a malicious application.

However, a check whether the application is malicious or not by using the vaccine engine is not be an accurate check with respect to an application having a variant pattern not included in the vaccine engine. Accordingly, the controller 220 controls the authorization/API verifying unit 208 and the dynamic analysis unit 212 to additionally perform the authorization/API check and the dynamic analysis in order for more accurate determination of the application that is not determined as a malicious application through a vaccine engine.

That is, if it is identified that the application has an authorization of security risk capable of leaking personal information of the user as a result of the check through the authorization/API verifying unit 208 and determined to a malicious URL, the controller 220 determines the relevant URL to a malicious URL. In this case, an authorization to determine whether a URL is a malicious URL or not by the authorization/API verifying unit 208 is changed according to a policy. In addition, the authorization/API verifying unit 208 determines whether a URL is a malicious URL by identifying that API for performing the authorization is really called through an additional decompiling analysis with regard to the application having an authorization of security risk which is regarded as a malicious URL. As such, information on a malicious URL determination through API check is also provided to the controller 220.

Furthermore, after the controller 220 really performs the relevant application through the dynamic analysis unit 212 as more reliable method to determine whether it is malicious or not additionally together with the authorization/API check, it determines the relevant URL to a malicious URL if the application really executed on the emulator is checked to perform certain malicious action.

When the URL included in the message requested to be transmitted to the user terminal 150 through the method described above is determined to a malicious URL, the controller 220 notifies information that the relevant message is an abnormal message to the message transmission server 110. In response, the message transmission server 110 permits the abnormal message not to be transmitted to the user terminal 150. Even if the message is transmitted, verifying information notifying that the relevant message is a message including a dangerous malicious URL is transmitted to thus avoid a damage caused by the abnormal message.

In addition, in preparation for the case that a malicious URL inducing a download of the malicious application is transmitted through a different route via the communication network like a messenger using the packet-based message server 160 besides a message service such as SMS, MMS, or the like, the controller provides URL information determined to a malicious URL to the blocking and guiding system 140 through the communication unit 200, and periodically updates it.

Meanwhile, in accordance with another embodiment of the present disclosure wherein URL information included in a message is configured to be extracted and applied through the spam filtering server 120, the controller determines whether the relevant URL is a malicious URL or a normal URL in the same method as described before, and only the determination result related to whether the relevant URL is malicious URL is provided to the spam filtering server 120. In this case, the spam filtering server 120 receives a checking result regarding a malicious URL, and if the URL is a malicious URL, it notifies information that the message is an abnormal message to the message transmission server 110, whereby the abnormal message may not be transmitted to the user terminal 150, or be alerted.

Figure 3:
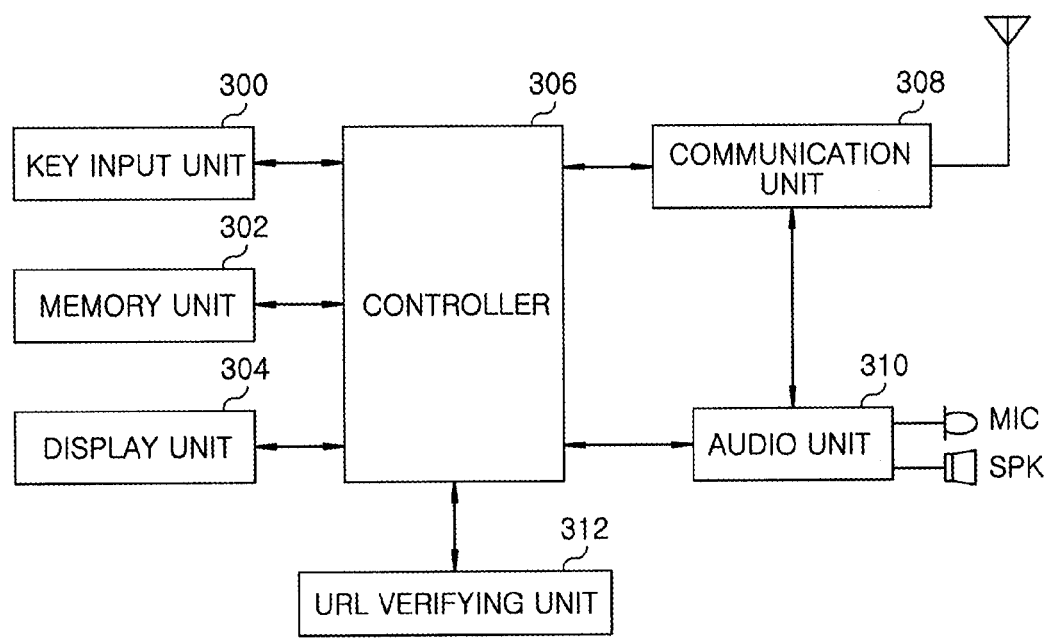
FIG. 3 is a detailed block diagram a of a user terminal in accordance with at least one embodiment of the present disclosure.

FIG. 3 is a detailed block diagram of a user terminal 150, e.g., a mobile communication terminal such as a smart phone in accordance with an embodiment of the present disclosure. Hereinafter, an operation of each component in the mobile communication terminal will be described in detail with reference to FIG. 3 and the components in the mobile communication terminal may be implemented by at least a processor, which is included in the mobile communication terminal. Other components of the user terminal 150, such as a key input unit 300, a display unit 304, a controller 306, a communication unit 308, an audio unit 310 and a URL verifying unit 312, is implemented by, or includes, one or more processors and/or application-specific integrated circuits (ASICs) specified for respectively corresponding operations and functions described herein.

Firstly, the key input unit 300 is configured with a number of numeral keys and function keys for various operations requested from a mobile communication terminal. The key input unit 300 generates a corresponding key data when the user presses a certain key and outputs it to the controller 306. The key input unit 300 may have different a character arrangement by the manufacturer or the country. In addition, the key input unit 300 may be displayed, if necessary, in the form of a touch screen on the display unit 304 in a software way instead of a physical keypad in case of a smart phone, a tablet PC, or the like.

The audio unit 310 modulates a voice signal being inputted through a microphone into a wireless signal according to a control of the controller 306, and demodulates a received wireless signal and transmits it to a speaker. The audio unit 310 may further include a codec unit for processing a voice signal to a variety of voice qualities set by the controller 306 in case of voice communication.

The communication unit 308 receives a message transmitted from the message provider 100 through the communication network. In this case, the message may be a message generated according to a request of a company such as financial services, manufacturers, open markets, etc. that may be the message provider 100, and for example, may include an announcement, a promotion or an advertisement that is related to the company.

The display unit 304 displays various information of a mobile communication terminal according to the control of the controller 306, and receives a key data generated from the key input unit 300 and various information signal of the controller 306 to display them. In accordance with an embodiment of the present disclosure, information notifying a risk of a URL included in the message may be displayed as a predetermined mark, picture, character, or the like.

The URL verifying unit 312 checks whether URL verifying information regarding a URL exists in the SMS, MMS or packet-based message received from the communication unit 308. If or when URL verifying information exists, the URL verifying unit extracts the URL verifying information and provides it to the controller 306.

The controller 306 controls an overall operation of a mobile communication terminal according to an operational program stored in the memory unit 302. The operational program is not only a basic operating system necessary for the operation of the mobile communication terminal, but also commonly refers to a software that facilitates the connection of the key input 300 with the display unit 304, manages an input/output of the data, or is previously programed to operate an internal application of the mobile communication terminal in a manufacturing phase.

Additionally, in accordance with an embodiment of the present disclosure, if a message such as various SMS, MMS message or a packet-based message is received, the controller extracts URL verifying information from the message including a URL by controlling the URL verifying unit 312 and overlaps a risk regarding the URL included in the message on a screen on which the message is displayed.

In this case, if it is identified that the URL included in the received message is a malicious URL by using the URL verifying information inserted as additional information notifying whether the message is normal, the controller 306, for example, displays information notifying that the received message is an abnormal message as a character or a picture on the screen or by outputting a sound, so that the user can recognize a risk of the message.

Figure 5:
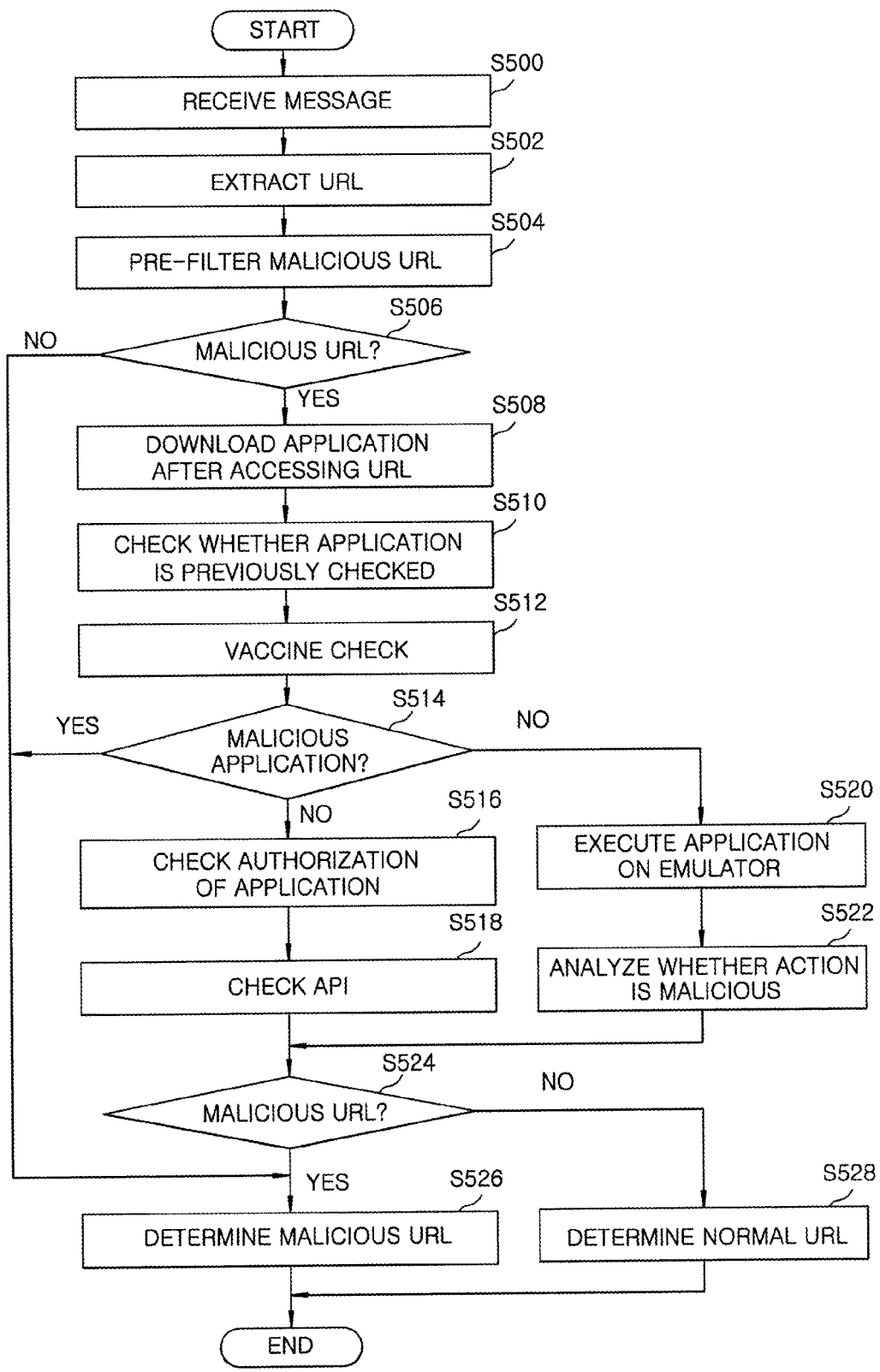
FIG. 5 is a flowchart illustrating a process of checking an abnormal message through a URL analysis by a message checking apparatus in accordance with at least one embodiment of the present disclosure.

FIG. 5 is a flowchart illustrating a process of checking whether a message to be transmitted to the user terminal 150 is an abnormal or not by in a message checking apparatus 130 in accordance with an embodiment of the present disclosure. Hereinafter, the embodiment of the present disclosure will be described in detail with reference to FIG. 1 to FIG. 5.

Firstly, the message checking apparatus 130, which is connected with the message transmission server 110 including the SMSC 112 and the MMSC 114 to receive a message therefrom, as shown in FIG. 1, receives the message from the SMSC 112, for example, to check whether the message is abnormal is or not (S500). Next, the message checking apparatus 130 extracts a URL included in the received message from the message (S602), and checks whether or not the URL extracted through the pre-filtering is a malicious URL (S504).

In pre-filtering performance, the message checking apparatus 130 compares the URL extracted from the message with a malicious URL list (S506), and if the extracted URL is in the malicious URL list, it determines it to a malicious URL (S526). After that, if determined to a malicious URL, it provides the determination information to the message transmission server 110, so that it blocks the relevant message to be transmitted to the user terminal 150 or alerts a risk of the URL. As described above, the malicious URL list refers to list information of URLs determined to a malicious URL through a check performed in advance in the message checking apparatus 130. This malicious list may be prepared in the message check apparatus 130, and URL information determined to a malicious URL in the malicious checking process may be periodically updated.

However, if it is not determined whether the URL is a malicious URL through the pre-filtering, the message checking apparatus 130 determines whether the URL is a malicious URL through a vaccine check, an authorization/API check, a dynamic analysis, or the like.

That is, the message checking apparatus 130 tries to access a web server (not shown) that is linked to a URL address through a wire/wireless communication network in order to verify the URL that is difficult to determine whether it is malicious through the pre-filtering, and then downloads a specific application that is provided when accessing the URL (S508).

Subsequently, the message checking apparatus 130 may check whether the application is malicious by comparing the downloaded application with signature information in the previously checked application and checking whether the application is the same or not (S510). The message checking apparatus 130 determines the relevant URL to a malicious URL if the application is checked as a malicious application through comparing the signature information and the application, and also determines the relevant URL as a normal URL if the application is checked as a normal application. In this example, the signature information, for example, may be a hash code such as SHA-256, MD5, or the like.

Thereafter, when the downloaded application is an application that has never been checked, the message checking apparatus 130 checks whether the application is malicious by using a vaccine engine that is prepared in advance (S512). The vaccine engine, for example, may be a commercially available vaccine engine provided from a vaccine company, and if the downloaded application is checked as malicious application at S514, the message checking apparatus 130 may determine the relevant URL to a malicious URL (S526).

However, a check whether the application is malicious by using the vaccine engine may not be an accurate check with regard to an application having a variant pattern not included in the vaccine engine. Accordingly, the message checking apparatus 130 may additionally perform an authorization/API check, a dynamic analysis, etc. with regard to an application that is not determined as malicious application through a vaccine engine.

That is, if or when it is not checked whether the application is malicious through a vaccine engine at S514, then the message checking apparatus 130 analyzes an execution file of the application and checks authorization information in the application (S516).

The authorization information is a record on information regarding an authorization capable of performing by the user terminal 150 when the application is installed in the user terminal. The malicious application, for example, has an authorization having a security risk such as "message reading", "conversation content stealing" etc. capable of leaking personal information of the user.

In addition, when the an authorization check reveals that the application downloaded has an authorization of security risk, API check may be additionally performed with regard to the application having the authorization of security risk (S518). In the API check performance, after decompiling an execution file of the relevant application, the message checking apparatus 103 checks whether the execution file is written or not to be really called.

Next, the message checking apparatus 130 checks whether the URL requested to be checked is malicious based on the authorization check and API check results against the application (S524). The message checking apparatus 130 may determine the relevant URL to a malicious URL if it is checked that an authorization of security risk is set in the application or API is written to be really called for performing an authorization of security risk according to an execution of the application, from the authorization check and API check results (S526).

On the other hand, if an authorization of security risk is not set in the application, or API is not written to be really called for performing an authorization of security risk according to an execution of the application, the message checking apparatus 130 may determine the relevant URL to a normal URL (S528).

Meanwhile, the message checking apparatus 130 additionally performs a more secure method of a dynamic analysis for checking the application that has not been checked whether it is malicious through a vaccine engine is malicious together with the authorization/API check and may check whether it is malicious or not.

That is, when it is not checked whether the application is malicious (S514), the message checking apparatus 130 really executes the application on the emulator (S520), and then analyzes an action of the application that is really executed (S522).

Next, the message checking apparatus 130 checks whether the URL subjected to the check is malicious based on the result of the dynamic analysis against the application (S524), and it may determines the relevant URL to a malicious URL if the action analysis result of the application really executed in the emulator is checked to execute any malicious action (S526).

Alternatively, based on the dynamic analysis result, if the application really executed on the emulator is checked not to perform any malicious action, the message checking apparatus 130 may determine the relevant URL to a normal URL (S528).

Figure 6:
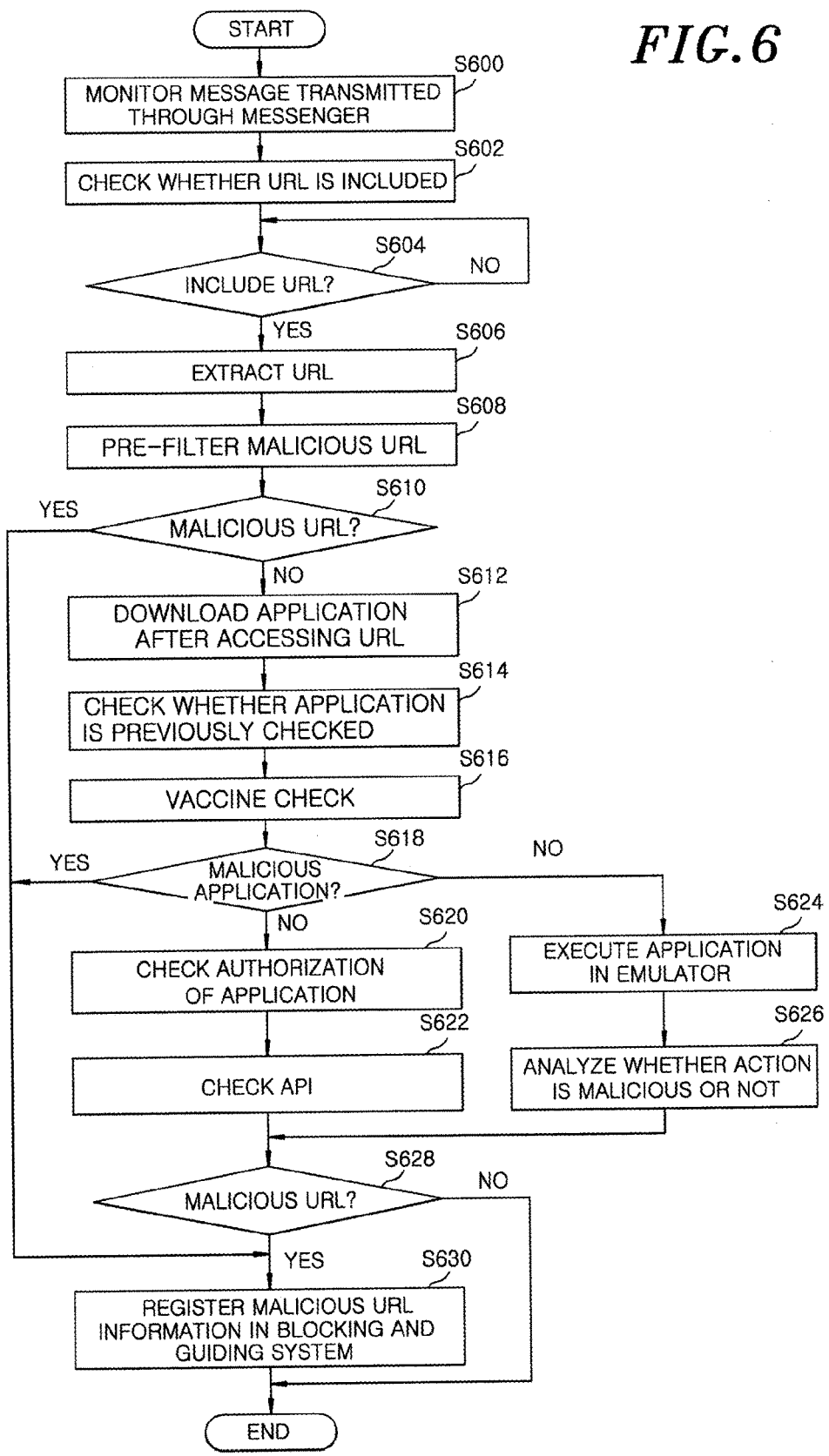
FIG. 6 is a flowchart illustrating a process of checking whether a message transmitted through a messenger is abnormal by a message checking apparatus in accordance with at least one embodiment of the present disclosure.

FIG. 6 is a flowchart illustrating a process of checking whether a message to be transmitted to the user terminal 150 through a messenger is abnormal by the message checking apparatus 130 in accordance with another embodiment of the present disclosure. Hereinafter, the embodiment of the present disclosure will be described in detail with reference to FIG. 1 to FIG. 4 and FIG. 6.

Firstly, the message checking apparatus 130 monitors a message being transmitted to the user terminal through various messengers using the communication network (S602).

If or when it is checked that a URL is included in a message being transmitted to the user terminal 150 (S604), the message checking apparatus 130 extracts the URL included in the received message from the received message (S606), and checks whether the URL extracted through the pre-filtering is a malicious URL (S608).

In the pre-filtering performance, the message checking apparatus 130 compares the URL extracted from the message with the malicious URL list (S610). If or when the extracted URL is in the malicious URL list, the message checking apparatus 130 determines the extracted URL to a malicious URL, and then if or when determined to a malicious URL, it provides the relevant URL information to the blocking and guiding system 140 and thus enables the relevant URL information to be registered in the blocking and guiding system 140.

However, if or when it is not determined whether the URL is a malicious URL through the pre-filtering, the message checking apparatus 130 determines whether the URL is a malicious URL through a vaccine check, an authorization/API check, or a dynamic analysis.

That is, the message checking apparatus 130 tries to access a web server (not shown) that is linked to URL address through a wire/wireless communication network in order to verify the URL that is difficult to be determined as being regarding whether it is malicious or not through the pre-filtering, and then downloads a specific application that is provided when accessing the URL (S612).

Next, the message checking apparatus 130 may check whether the downloaded application is malicious by comparing the downloaded application with signature information of the previously checked application and checking whether the application is the same or not (S614).

In addition, when the downloaded application is an application that has never been checked, the message checking apparatus 130 checks whether the application is malicious by using a vaccine engine that is prepared in advance (S616).

Next, if or when the downloaded application is checked to malicious application at S618, the message checking apparatus 130 determines the relevant URL to a malicious URL and provides the relevant URL information to the blocking and guiding system 140, thereby enabling it to be registered in the blocking and guiding system 140 (S630).

However, a check whether the application is malicious by using the vaccine engine may not be an accurate check with regard to an application having a variant pattern not included in the vaccine engine. Accordingly, the message checking apparatus 130 additionally performs an authorization/API check, a dynamic analysis, etc. with regard to an application that is not determined as malicious application through a vaccine engine.

That is, if or when it is not checked whether the application is malicious through a vaccine engine at S618, then the message checking apparatus 130 analyzes an execution file of the application and checks authorization information of the application (S620).

This authorization information is a record on information regarding an authorization capable of performing by the user terminal 150 when the application is installed in the user terminal. A malicious application, for example, has an authorization having a security risk such as "message reading", "conversation content stealing" etc. capable of leaking a personal information of the user.

In addition, when the application downloaded through an authorization check is checked to an authorization of security risk, API check may be additionally performed with regard to the application having the authorization of security risk (S622). In the API check performance, after decompiling an execution file of the relevant application, the message checking apparatus 103 checks whether the execution file is written to be really called.

Next, the message checking apparatus 130 checks whether the URL included in the message is malicious based on the authorization check and API check results against the application (S628).

In this case, the message checking apparatus 130 determines the relevant URL to a malicious URL if or when the authorization of security risk is set in the application or API is written to be really called for performing an authorization of security risk according to an execution of the application, from the authorization check and API check results.

However, if or when the authorization of security risk is not set in the application, or API is not written to be really called for performing an authorization of security risk according to an execution of the application, the message checking apparatus 130 determines the relevant URL to the normal URL.

Meanwhile, the message checking apparatus 130 additionally performs a more secure method of a dynamic analysis for checking the application that has not been checked whether it is malicious through a vaccine engine is malicious together with the authorization/API check and checks whether it is malicious or not.

That is, when it is not checked whether the application is malicious (S618), the message checking apparatus 130 really executes the application on the emulator (S624), and then analyzes an action of the application that is really executed (S626).

Next, the message checking apparatus 130 checks whether the URL subjected to the check is malicious based on the result of the dynamic analysis against the application (S628), and it determines the relevant URL to malicious URL if the action analysis result of the application really executed in the emulator is checked to execute any malicious action.

Alternatively, according to the dynamic analysis result, if the application really executed on the emulator is checked not to perform any malicious action, the message checking apparatus 130 determines the relevant URL to a normal URL.

Next, based on the determination result of whether the URL is malicious, the message checking apparatus 130 provides the relevant URL information to the blocking and guiding system 140 and thus enables it to be registered in the blocking and guiding system 140 (S630).

Accordingly, while a user clicks a notice of a malicious URL displayed on a chat window at the time of transmitting/ receiving a message through a messenger, the relevant malicious URL could be blocked with the blocking and guiding system 140; therefore, a damage of the user is avoided.

Figure 7:
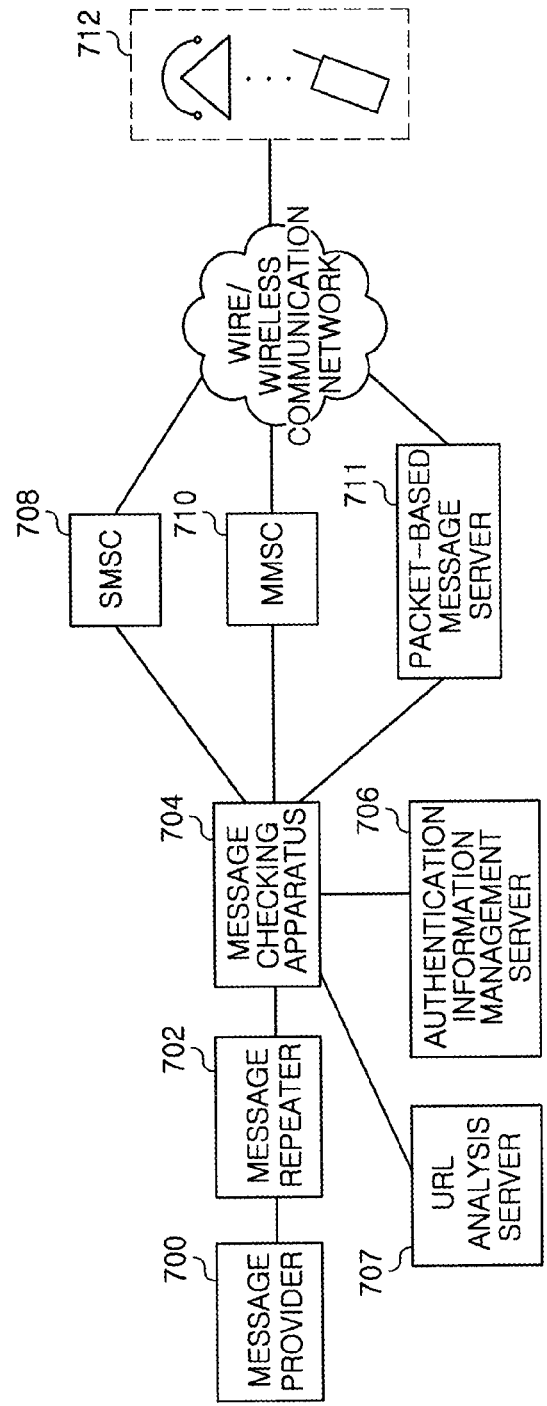
FIG. 7 is a diagram of a communication network for transmitting a message, including a message checking apparatus to which another exemplary embodiment of the present disclosure is applied.

FIG. 7 is a diagram of a communication network for transmitting a message including a message checking apparatus to which another embodiment of the present disclosure is applied.

Hereinafter, an operation of each component in the communication network for transmitting a message will be described in detail with reference to FIG. 7.

Firstly, a message provider 700 means an entity sending a message such as SMS (Short Message Service), MMS (Multimedia Message Service) message or a packet-based message to a user terminal 712 connected to wire/wireless communication networks including mobile communication networks. The above user terminal 712, for example, includes a mobile communication terminal such as a mobile phone, a smart phone, or the like or general wire/wireless telephone including a display window capable of receiving a message. The message provider 700, for example, is a server managed or operated by a company or an unspecific person such as financial services, manufacturers, open markets, or the like The message sent by the message provider 700, for example, is a message including an announcement, a promotion or an advertisement that is related to the relevant company.

A message repeater 702 generates a message of content corresponding to a sending request when the message provider 700 receives a message sending request from a company or an unspecific person such as financial services, manufacturers, or open markets to the user terminal of the user who is a target, transmits it to a message checking apparatus 704 such as VMG (Vertical Multimedia Gateway) in the communication network, and then repeats a message requested to be transmitted by the message provider 700 to the user terminal 712. That is, the message repeater 702 receives a data such as a content of transmission and information such as MIN (mobile Identification Number) of the user terminal 712 of a target user who has to receive the relevant message from the message provider 700, configures a message, and then transmits it to the message checking apparatus 704.

The message checking apparatus 704 is an apparatus such as VMG, and performs a message processing that converts a message received from the message repeater 702 into a format of message suitable for a device characteristic of the targeted user terminal 712. That is, when the message checking apparatus 704 receives a message transmitted from the message provider 700 through the message repeater 702, it converts a data format into a form that could be displayed in the user terminal 712 with reference to information about a specification of the user terminal 712, and then if or when the data format is SMSC (Short Messaging Service Center) 708, MMSC (Multimedia Messaging Service Center) 710 or a packet-based message, it transmits the message to a packet-based message server 711 performing a transmission/ reception of the packet-based message.

In this case, a message requested to be transmitted to the user terminal 712 by the message provider 700 is made in a form of an MMS message, SMS message or a packet-based message. For example, if or when the requested message is a form of an MMS message, the message checking apparatus 704 converts the requested message into MMS message format whose MMS version is matched in consideration of an MMS version of the targeted user terminal 712. However, if or when user terminal can only receive an SMS message, the message checking apparatus 704 converts the requested message into SMS message format.

Meanwhile, since a message of a smishing enterprise trying to perform a smishing that is fraudulent method for stealing a micropayments authentication code, personal information by installing malicious code into the user terminal 712 such as a smart phone, or the like through a spam message including a financial instrument guide, an offer of a shopping mall coupon, and others stealing a name of the company may be included in the message being transmitted to the user terminal 712, a damage of the user may be occurred, as well as there is a problem that the company image may be tarnished.

In addition, a message including an abnormal URL among the messages may be existed. This message including the abnormal URL causes damage to a user by enabling an application including the malicious URL to be installed or enabling a smishing enterprise in abroad to be connected when the user clicks the abnormal URL.

Accordingly, the message checking apparatus 704 has an authentication module for authenticating whether the message is normal transmitted from the normal company and authenticates whether the message is from the message provider 700 who is normally authenticated. Further, the message checking apparatus 704 provides authentication confirmation information representing that the relevant message is normal to the user terminal 712, so that the user terminal 712 displays an authenticated message in distinction from an unauthenticated message such as an illegal message of a smishing enterprise.

In authenticating the message from an authenticated message provider 700, the message checking apparatus 704, for example, extracts authentication identifier information, transmits it to an authentication information management server 706 that manages pre-assigned authentication identifier information and requests a check whether the authentication identifier information is the pre-assigned authentication identifier information in advance. The authenticated message provider 700 also receives a result of the check from the authentication information management server 706 to perform an authentication. The authentication identifier information means information employed to identify a company that transmits a normal message, and for example, is CID (caller ID) information. In addition, the authentication information management server 706 managing the authentication identifier information, for example, is a CID management server.

That is, in accordance with an embodiment of the present disclosure, the message checking apparatus 704 assigns authentication identifier information to the message provider 700 regarded as a normal company in advance, the authentication identifier information being used to identify that a message being transmitted to the user terminal 712 from the relevant company is not a spam. Upon receiving a message, the message checking apparatus 704 authenticates whether the received message is from the normal company, performs a message processing such as doing the authentication identification information be included in the message if the message is authenticated, and then, according to the kinds of message, provides the processed message to the SMSC 708, MMSC 710, or a packet-based message server 711

Further, the message checking apparatus 704 checks whether a URL is included in a message from the message provider 700 at the time of receiving the message. If the URL is included in the message, the message checking apparatus 704 analyzes whether the URL included in the message is risky, generates URL verifying information notifying a risk of the URL, and then provides the message including the URL verifying information to the user terminal 712. This URL verifying information may be information notifying that the message is an abnormal message. Accordingly, it is possible for the user terminal 712 to recognize a risk of the URL included in the received message, thereby resulting in avoiding a damage caused by the abnormal URL.

In an analysis of a risk of the URL, the message checking apparatus 704, for example, checks whether there exists an inducement of application installment occurring according to a click of the URL by performing an operation of direct URL click or checks whether there is a link to a server in abroad, thereby analyzing a risk of the URL and classifying the kinds of risk.

Further, in an analysis of a risk of the URL, for example, the risk of the URL may be analyzed by using the URL analysis server 707 separately embodied to analyze a risk of the URL. In this case, if or when a URL is included in the message, the message checking apparatus 704 transmits the relevant URL to the URL analysis server 707 and request for the URL analysis server to check whether the URL is a risky URL. The message checking apparatus 704 also identifies whether the URL is risky according to the result from the URL analysis server 707.

As such, a message such as a SMS message, a MMS message, or a packet-based message into which information such as the authentication identification information or URL verifying information that notifies whether the message is normal is added is transmitted to the SMSC 708, the MMSC 710 or the packet-based message server 711, which in turn transmits it to the relevant user terminal 712 through the communication network.

Then, the user terminal 712 checks whether the authentication identification information notifying whether a message is normal or not is included in the received message. If or when the authentication identification information is included in the message, after identifying it, the user terminal 712 displays it as a character or a picture on the screen or outputs a sound, so that the user can recognize the authenticated message without fear.

In addition, the user terminal 712 checks whether the URL verifying information notifying whether a message is normal or not is included in the received message. If or when the URL verifying information is included in the message, after identifying a risk of the URL included in the received message, the user terminal 712 displays it as a character or a picture on the screen or outputs a sound, thereby causing to avoid a damage caused by an abnormal URL.

Figure 8:
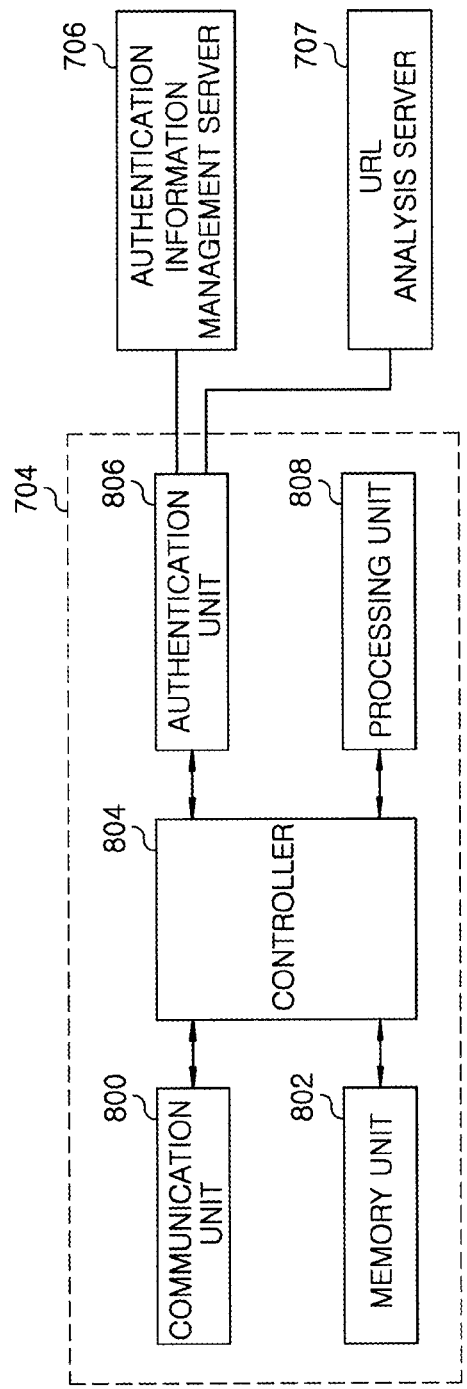
FIG. 8 is a detailed block diagram of a message checking apparatus in accordance with another exemplary embodiment of the present disclosure.

FIG. 8 is a detailed block diagram of the message checking apparatus 704 in accordance with another embodiment of the present disclosure, which includes a communication unit 800, a memory unit 802, a controller 804, an authentication unit 806, and a processing unit 808. Each of the communication unit 800, the memory unit 802, the controller 804, the authentication unit 806, and the processing unit 808 is implemented by, or includes, one or more processors and/or application-specific integrated circuits (ASICs) specified for respectively corresponding operations and functions described herein.

Hereinafter, an operation of each component of the message checking apparatus 704 will be described in detail with reference to FIG. 8. Each component of the message checking apparatus 704, such as the communication unit 800, the memory unit 802, the controller 804, the authentication unit 806, and the processing unit 808 is implemented by, or includes, one or more processors and/or application-specific integrated circuits (ASICs) specified for respectively corresponding operations and functions described herein.

Firstly, the communication unit 800 performs a data transmission/reception with the message repeater 702 and the SMSC 708, MMSC 710, and the packet-based message server 711, receives a message such as a SMS, MMS or packet-based message transmitted from the message provider 700, and transmits the processed message to the SMSC 708, MMSC 710 or packet-based message server 711 so that the authentication identification information is included in the processed message in accordance with an embodiment of the present disclosure.

The memory unit 802 stores an operation control program for an overall operation of the message checking apparatus 704, and the controller 804 controls an overall operation of the message checking apparatus 704 according to the operation control program stored in the memory unit 802.

The authentication unit 806 authenticates the message from the message provider 700 previously selected in accordance with an embodiment of the present disclosure. That is, the authentication unit 806 extracts the authentication identifier information included in the message by the message provider 700 received from the message repeater 702, and checks whether the authentication identifier information by the message provider 700 included in a previously assigned authentication identifier information so that it is possible to authenticate whether the received message is a message transmitted from the authenticated message provider 700.

In an authentication of the message provider 700, the authentication unit 806 extracts the authentication identifier information and transmits it to the authentication information management server 706 managing the authentication identifier information previously assigned to a normal company to request for the authentication information management server to perform a check whether it is the previously assigned authentication identifier information. The authentication unit 806 also performs an authentication by receiving a check result from the authentication information management server 806. Further, the authentication unit 806 has the previously assigned authentication identifier information within its own data base (DB); therefore, it is possible to autonomously perform a check against the authentication identifier information without interworking with the authentication information management server 706.

Furthermore, the authentication unit 806 checks whether a URL is included in a message received from the message provider 700, and if the URL is included, analyzes whether the URL included in the message is risky in accordance with an embodiment of the present disclosure.

In an analysis of URL risk, the authentication unit 806, for example, performs an operation directly clicking the URL and checks whether there is an inducement of application installation occurred by clicking of URL or a link to an unknown server in abroad, thereby analyzing a risk of the URL and classifying the kinds of risk. Further, in an analysis of URL risk, the authentication unit 806, for example, analyzes a risk of the URL by using the URL analysis server 707 separately embodied to analyze the risk of the URL. In this case, if a URL is included in the message, the authentication unit 806 transmits the relevant URL to the URL analysis server 707 and check whether the URL is risky. Also, the authentication unit 806 receives an analysis result from URL analysis server 707 and identify whether URL is risky.

If or when the message provider 700 is authenticated to be normal by the authentication unit 806, the processing unit 808 generates the authentication identification information verifying that the relevant message transmitted from the message provider 700 is a normal message, and processes the generated authentication identification information to be included in the message transmitted from the message provider 100.

In this case, the processing unit 808 generates the authentication identification information by using various methods, and hereinafter an operation generating the authentication identification information by the processing unit 808 will be described in detail.

Firstly, as the simplest method, the processing unit 808 generates simple information such as true or false whether the message transmitted from the message provider 700 is authenticated and add it to a certain area of a header or a data area in the message. In this case, even though a separate encryption decoding algorithm is not equipped with the user terminal 712 of a mobile communication terminal, it is possible to check whether the message is a simply authenticated message by reading the relevant authentication identification information in the pre-arranged area.

Next, the processing unit 808 encrypts the authentication identification information using a predetermined encryption algorithm based on a user terminal information of the target user terminal 712 to which a message will be transmitted, for example, MIN (Mobile Identification Number) information in order to secure the authentication identification information, and then add the encrypted authentication identification information to a certain area of a header or a data area in the message. The encryption algorithm, for example, may be a hash algorithm. Thereafter, the user terminal 712 extracts the encrypted authentication identification information in the pre-arranged area of the message, decodes the encryption and read the authentication identification information by using the same encryption algorithm used when the authentication identification information is encrypted and the user terminal information such as the MIM information.

Next, the processing unit 808 transmits the authentication identification information after it is included in a message as an OTP (one time password) value. The OTP value is a value generated by inputting user terminal information inclusive of a transmission time of the message, MIN, and others as a parameter, which may be added to a certain area of a header or a data area in the message. In this case, the user terminal 712 generates an OTP value by implementing an OTP generation function, and if or when the generated OTP value is the same as the OTP value included in the message, may be identified that the received message is the authenticated message.

In this connection, the same OTP generator as the OTP generator used to generate an OTP value in the message checking apparatus 704 is equipped with the user terminal 712. If or when the authentication identification information together with a message is transmitted as the OTP value, the message checking apparatus 704 generates the OTP value by inputting a message transmission time that is the same parameter used for an input value of the OTP generator and the user terminal information and then compare the generated OTP value with the OTP value included in the message.

In the embodiment, the processing unit 808 generates the authentication identification information by using a method that records a newly defined specific value for instructing whether a message is authenticated in a PID (Packet Identification) field in the message format.

The PID field is one that is recorded as a variety of predetermined values according to a characteristic of a message and causes the user terminal 712 to perform an operation corresponding to a value recorded in the relevant PID field. The processing unit 808 defines a new specific value in the PID field in which various defined values may be recorded for authenticating a message, and then transmit it along with the message for use in authenticating the message. In this case, information for the newly defined specific value in the PID field may be provided in advance to the user terminal 712.

The user terminal 712 may then check a value recorded in the PID field of the received message and thus identify whether the received message has been authenticated or not.

Meanwhile, URL information may be included in a message provided from the message provider 700. In this case, the processing unit 808 analyzes whether a URL is risky or not. If it is analyzed that the URL included in the message is risky, the processing unit 808 generates URL verifying information notifying a risk of the URL and processes the URL verifying information to be included in the message as additional information.

In a generation of the URL verifying information, for example, if the URL included in the message is analyzed to a URL having a risk to be accessed to a server located in abroad that safety is not secured, the processing unit 808 may generate information notifying that the server being accessed through the URL is located in abroad as the URL verifying information.

Further, for example, if the URL included in the message is analyzed to induce an installation of a specific application that safety is not secured, the processing unit 808 may generate information notifying that the specific application may be installed.

Next, in an inclusion of the generated URL verifying information, the processing unit 808 may add it to a certain area of a header or a data area of a message, for example. In this case, the user terminal 712 such as a mobile communication terminal may read the URL verifying information in a pre-arranged area of the message, check whether the URL is risky, and then display whether the URL is risky along with the message so that the user may previously recognize a risk of the URL.

Figure 9:
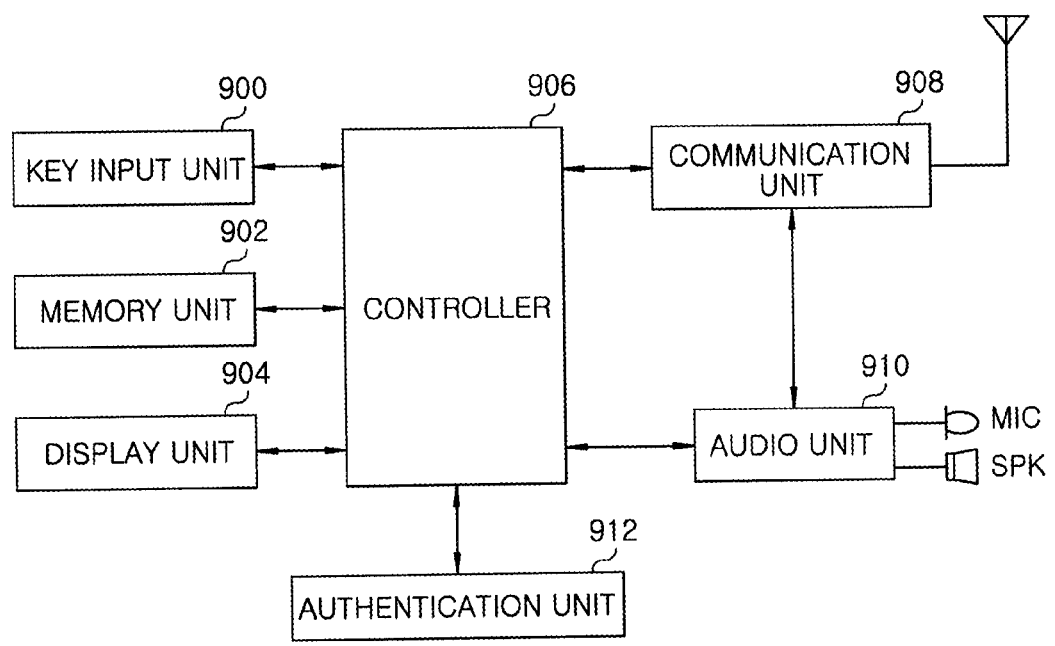
FIG. 9 is a detailed block diagram of a user terminal in accordance with another exemplary embodiment of the present disclosure.

FIG. 9 is a detailed block diagram of the user terminal 712, e.g., a mobile communication terminal such as a smart phone in accordance with an embodiment of the present disclosure. Hereinafter, an operation of each component of the mobile communication terminal will be described in detail with reference to FIG. 9. Each component of the mobile communication terminal such as a key input unit 900, a display unit 904, a controller 906, a communication unit 908, an audio unit 910, an authentication unit 912 is implemented by, or includes, one or more processors and/or application-specific integrated circuits (ASICs) specified for respectively corresponding operations and functions described herein. Firstly, the key input unit 900 may be configured with a number of numeral keys and function keys for various operations requested from the mobile communication terminal. The key input unit 900 also generates a corresponding key data when the user presses certain keys and outputs it to the controller 906. The key input unit 900 may differ in a character arrangement by the manufacturer or the country. In addition, the key input unit 900 may be displayed, if necessary, in the form of a touch screen on the display unit 904 in a software way instead of a physical keypad in case of a smart phone, a tablet PC, or the like.

The audio unit 910 modulates a voice signal being inputted through a microphone into a wireless signal according to a control of the controller 906, and demodulates a received wireless signal and transmits it to a speaker. The audio unit 910 may further include a codec unit for processing a voice signal to a variety of voice qualities set by the controller 906 in case of voice communication.

The communication unit 908 receives a message transmitted from the message provider 700 through the communication network. In this case, the message may be a message generated according to a request of a company such as financial services, manufacturers, open markets, etc. that may be the message provider 700, and may include an announcement, a promotion or an advertisement that is related to the company.

The display unit 904 displays various information of a mobile communication terminal under the control of the controller 906, and receives a key data generated from the key input unit 900 and various information signal of the controller 906 to display them. In accordance with an embodiment of the present disclosure, information notifying that a message is authenticated may be represented as a predetermined mark or a picture or a character such as a logo of the relevant company. In addition, it is possible to display information notifying a risk of the URL included in the message as a predetermined mark or a picture or a character.

The authentication unit 912 checks whether the authentication identification information as information notifying whether the message is normal is attached to an SMS, MMS message or a packet-based message received from the communication unit 908. If or when the authentication identification information exists, the authentication unit 912 extracts the relevant authentication identification information and checks whether the received message is authenticated or not.

In identifying the authentication identification information, if or when the authentication identification information is not encrypted, it is possible to check whether the message is a simply authenticated message reading the relevant authentication identification information in a pre-arranged area of the message.

That is, the message checking unit 704 generates simple information such as true or false whether the message transmitted from the authenticated message provider 700 is authenticated and add it to a certain area of a header or a data area in the message. In this case, even though a separate encryption decoding algorithm is not equipped with the user terminal 912, whether the message is a simply authenticated message is checked by reading the relevant authentication identification information in the pre-arranged area.

Next, if or when the authentication identification information is encrypted using a predetermined encryption algorithm such as a hash algorithm, the authentication unit 912 extracts the authentication identification information encrypted in the pre-arranged area of the message decodes the encryption, and identifies the authentication identification information by using the same encryption algorithm used when the authentication identification information is encrypted and the user terminal information such as the MIN. In this case, it is assumed that the same encryption algorithm is previously equipped with the user terminal 712 and the message checking apparatus 704.

In addition, if or when an OTP value is received as the authentication identification information together with the message, the message checking apparatus 704 generates the OTP value by inputting a message transmission time that is the same parameter used for an input value of the OTP generator. Next, if the OTP value included in the message is equal to the OTP value generated in the user terminal 712 having the OTP generation function, the authentication unit 912 may identify whether the received message is authenticated.

In addition, if the authentication identification information is recorded as a newly defined specific value for instructing whether a message is authenticated in a PID field in the message format, the authentication unit 912 may identify whether the received message is authenticated by checking whether a value recorded in the relevant PID field is a predetermined value for instructing whether the message is authenticated.

In this case, the PID field is a field that is recorded as a variety of predetermined values according to a characteristic of a message and causes the user terminal 712 to perform an operation corresponding to the value recorded in the relevant PID field. The message checking unit 704 defines a specific value for authenticating a message in accordance with an embodiment of the present disclosure and records a specific value instructing whether the message is authenticated in the PID filed before providing it to the user terminal 712.

Accordingly, the authentication unit 912 checks the value recorded in the PID field in the received message and thus identify whether the received message has been authenticated or not.

Further, the authentication unit 912 checks whether there exists the URL verifying information notifying whether the message such as the SMS, MMS or packet-based message received from the communication unit 908 is normal. If the URL verifying information exists, the authentication unit 912 may extract the relevant URL verifying information and thus provide it to the controller 906.

The controller 906 controls an overall operation of the mobile communication terminal according to an operational program stored in a memory unit 902. The operational program is not only a basic operating system necessary for the operation of the mobile communication terminal, but also commonly refers to a software that facilitates the connection of the key input 900 with the display unit 904, manages an input/output of the data, or is previously programed to operate an internal application of the mobile communication terminal in a manufacturing phase.

In addition, if or when a message transmitted from a number of message provider 700 in accordance with an embodiment of the present inventor, the controller 900 controls the authentication unit 912 to check the authentication identification information of the relevant message. If the message is authenticated, the controller 906 allows the authenticated message to be displayed in various methods along with a receiving alarm of the message so that a user can check whether the currently received message is authenticated or not.

If or when the authenticated message, for example, an SMS or MMS message is received, the controller 906 may display a predetermined logo, an authentication mark, or an authentication character of the relevant company on a message condensed window for showing a content of the message, display a character such as "it is authenticated message" as a popup message, and also display both of the authentication mark and the popup message at the same time.

Further, if or when the user selects the message displaying the authenticated message to identify the content of the relevant message, the controller 906 may display the content of the relevant message, with displaying the popup message such as a phrase "safe message". Therefore, even when the user really clicks the message, the user again recognizes that the relevant message is an authenticated message.

In addition, in case of a packet-based message, the relevant message is displayed on the screen such as a conversation window for the packet-based message, and the relevant company logo, the authentication mark, or the authentication character representing the authenticated message may be displayed together with the content of the relevant message as in a case of SMS, MMS message. Moreover, when the reception of the packet-based message is set to be displayed as the popup message, it is possible to display that the relevant message is an authenticated message by using the company logo, the authentication mark, or the authentication character with the popup while notifying a reception of the packet-based message as a popup,.

Figure 11:
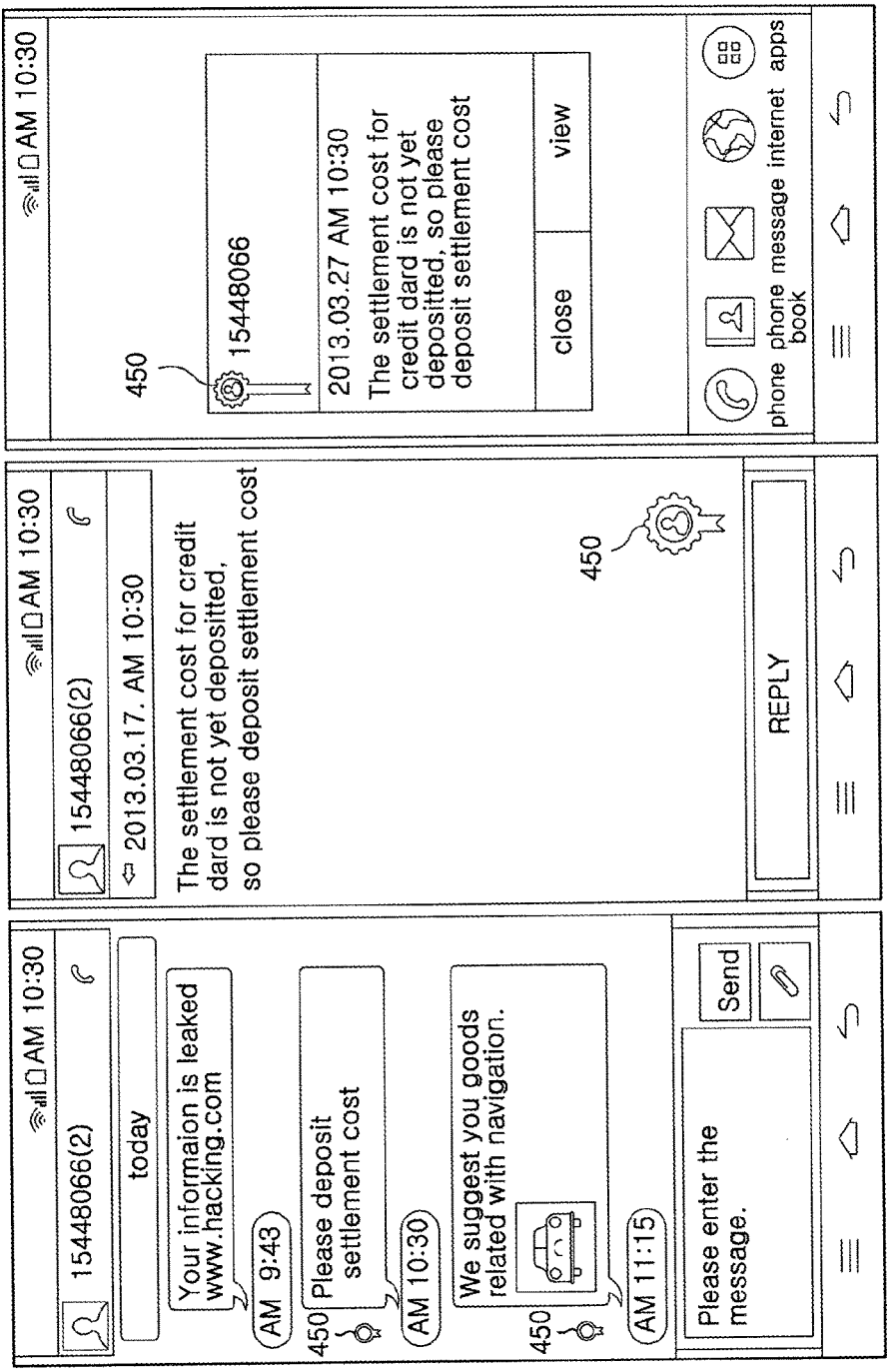

FIG. 10 shows an illustrative company logo for an authenticated message only that is displayed on a message content condensed window, and FIG. 11 shows an illustrative authentication mark 450 for an authenticated message only that is displayed on a message content condensed window.

Figure 12:
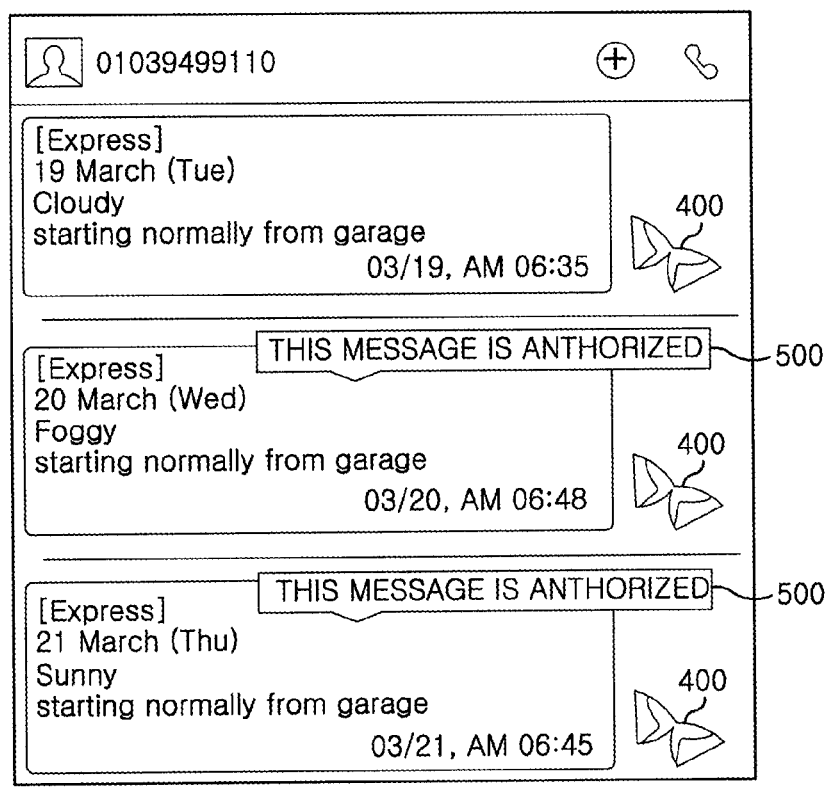

In addition, FIG. 12 shows an illustrative company logo 400 that is displayed along with a specific phrase 500 such as an authentication character "it is an authenticated message" notifying the authenticated message.

As such, in the above examples, the controller 906 enables the user to easily distinguish an authenticated message from an unauthenticated message by displaying the authentication identification message using various methods capable of enhancing the user's cognitive ability; therefore, it may be prevented that the user doubts the authenticated message as a spam message and does not check it.

Further, in case where a message includes a URL, the controller 906 controls the authentication unit 912 to extract the URL verifying information inserted into the message and displays a risk of the URL included in the message on the screen of the receiver.

If or when a location of the server that is accessed through the URL included in the message received by using the URL verifying information is identified in abroad, for example, the controller 906 displays information notifying that the relevant URL will access the server located in abroad as a character or a picture on the screen or outputs a sound; therefore, the user may recognize a risk of the URL.

In addition, if the URL included in the message received through the URL verifying information is identified to induce a specific application, for example, the controller 906 may display information notifying an inducement of the specific application by the relevant URL as a character or a picture on the screen or outputs a sound, so that the user may recognize a risk of the URL.

Figure 13:
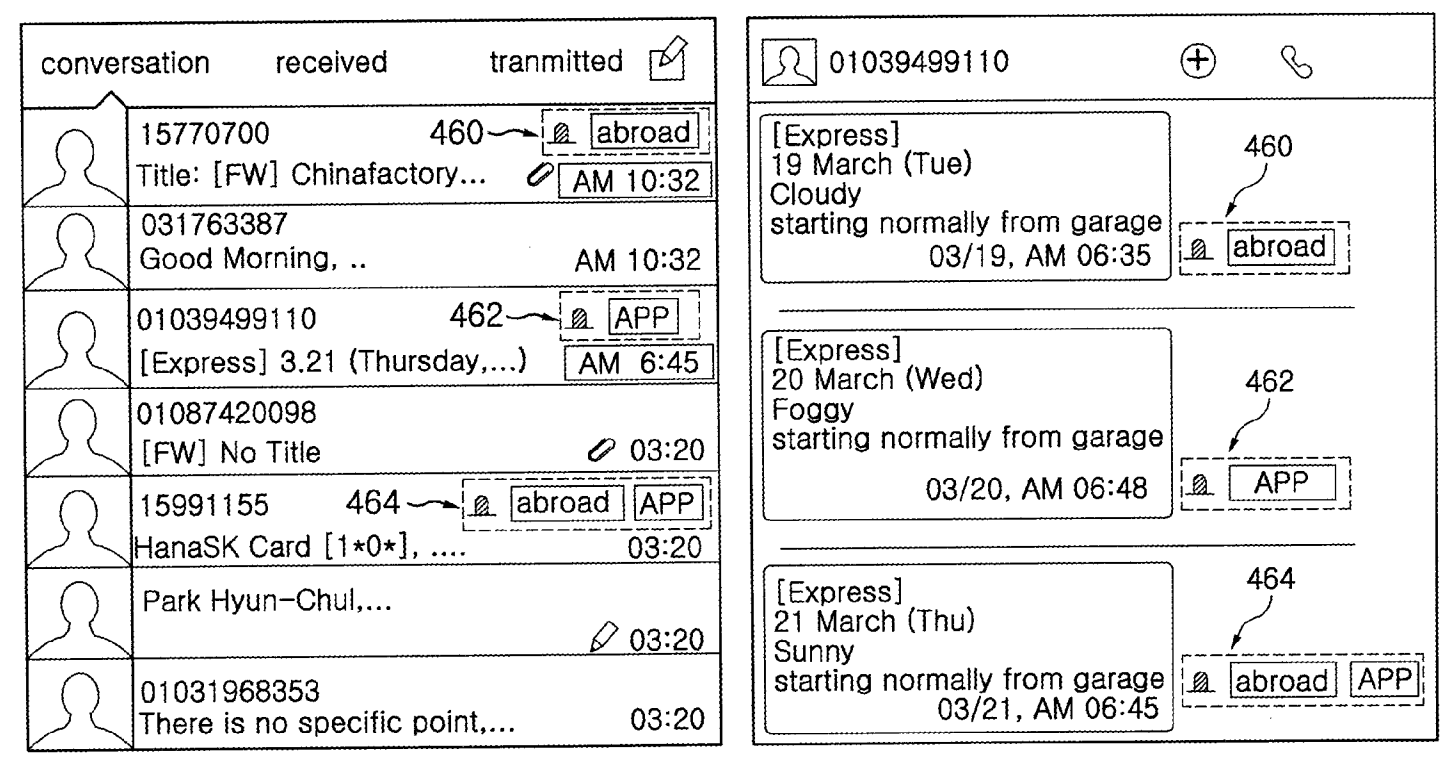

FIG. 13 shows illustrative URL risk information that is displayed on a message condensed window for showing a content of the received message.

In FIG. 13, if or when it is identified that a server being accessed through the URL included in the message received by using the URL verifying information is located in abroad, the controller 906 displays the information notifying that the relevant URL is accessed to the server in abroad, for example, a character "abroad" along with an alerting display like a reference numeral 460 on the message condensed window for the relevant message.

Further, if or when the URL included in the message received through the URL verifying information is identified to induce a specific application, the controller 906 may display information notifying an inducement of the specific application by the relevant URL, for example, a character "APP" along with an alerting display like the reference numeral 462 on the message condensed window for the relevant message.

In addition, if or when it is identified that the URL included in the message causes to access a server in abroad and induce a specific application, the controller 906 may display both "abroad" and "APP" along with an alerting display like a reference numeral 464 on the message condensed window for the relevant message.

In the above examples, if or when the message including the URL is received, the controller 906 displays a risk of the URL included in the message for enhancing a user's cognitive ability by using various methods so that the user can easily recognize the risk of the URL. Therefore, it is possible to avoid a damage caused by an abnormal URL.

Figure 14:
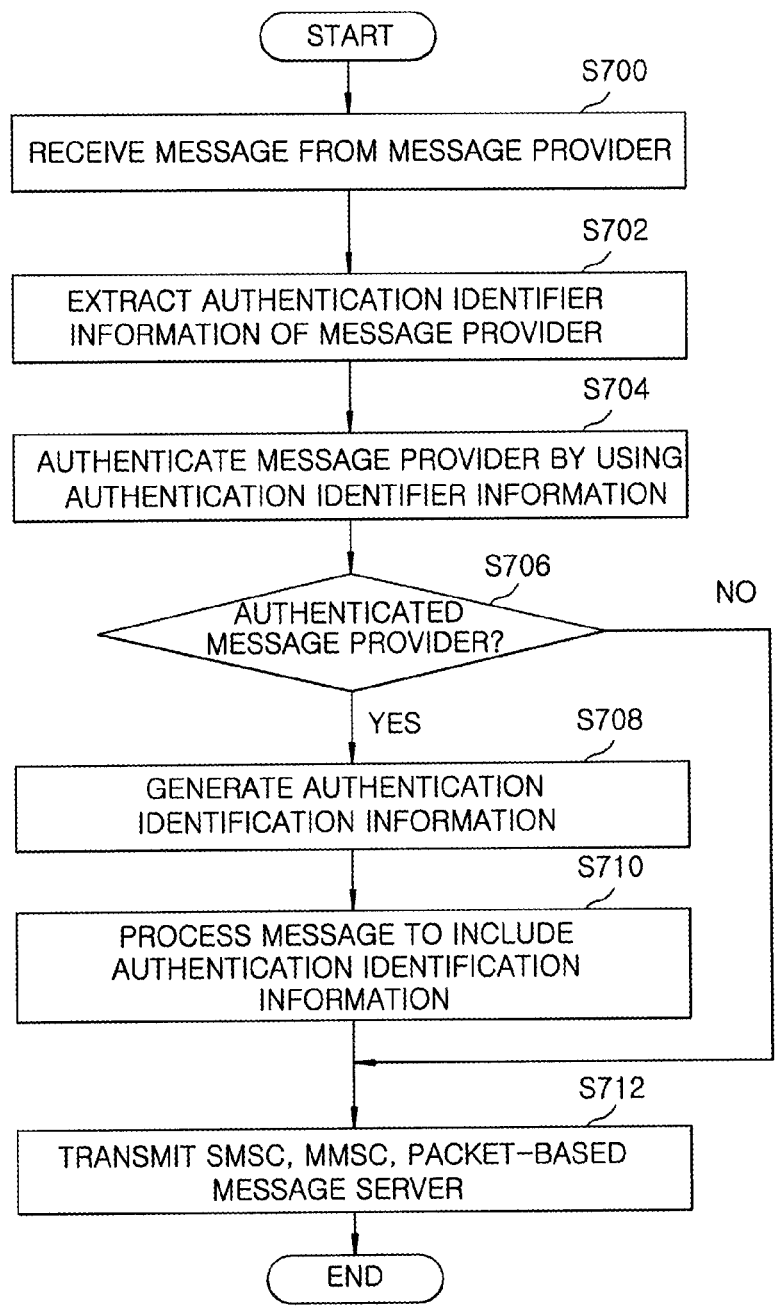
FIG. 14 is a flowchart illustrating a process of authenticating a message by a message checking apparatus in accordance with another exemplary embodiment of the present disclosure.

FIG. 14 is a flowchart illustrating a process of authenticating a message by a message checking apparatus 740 in accordance with another embodiment of the present disclosure, which will be described in detail with reference to FIG. 7 to FIG. 14.

Firstly, the message checking apparatus 704 receives various messages being transmitted to the targeted user terminal 712 from a number of companies such as financial services, manufacturers, open markets that may be the message provider 700 (S700).

The user terminal 712, for example, includes a mobile communication terminal such as a mobile phone, a smart phone, or the like or a general wire/wireless telephone including a display window capable of receiving a message. In the embodiment of the present disclosure, for the convenience of explanation, a mobile communication terminal such as a mobile phone, a smart phone, or the like will be described as an example.

The message checking apparatus 704 extracts the authentication identification information of the message provider 700 from the received message (S702). In this case, the authentication identification information may be information that is set to identify the relevant company against a company transmitting a normal message, and may include CID information or a series of numeral information, for example.

As such, after extracting the authentication identifier information, the message checking apparatus 704 checks the extracted authentication identifier information and then authenticates whether the message provider 700 is a normal message provider (S704).

Specifically, for example, the message checking apparatus 704 compares the authentication identifier information extracted from the received message with all of authentication identifier information previously registered in the authentication information management server 706. If or when there is the extracted authentication identifier information matching the previously registered authentication identifier information, the message checking apparatus 704 may authenticate the message provider 700 transmitted the relevant message as the normal message provider.

When the message provider 700 that has transmitted the message is determined to the unauthenticated provider 700 through a check of the authentication identifier information (S706), the message checking apparatus 704 does not insert additional information such as the authentication identification information into the relevant message and process it by using a method that is the same as a general message before transmitting it to the user terminal 712 through the SMSC 708, MMSC 710 or packet-based message server 711 (S712).

However, when the message provider 700 that has transmitted the message is determined to the authenticated provider 700 through a check of the authentication identifier information (S706), the message checking apparatus 704 generates authentication identification information meaning that the relevant message is a safe message transmitted from the message provider that is authenticated (S708).

In this regard, the message checking apparatus 704 generates the authentication identification information by using different methods.

Firstly, in the simplest method, the message checking unit 704 generates simple information such as true or false whether the message transmitted from the authenticated message provider 700 is authenticated and add it to a pre-arranged certain area of a header or a data area in the message.

Next, the message checking unit 704 encrypts the authentication identification information using a predetermined encryption algorithm based on user terminal information of the target user terminal 712 to which the message will be transmitted, for example, MIN information in order for a security of the authentication identification information, and then add the encrypted authentication identification information to a certain area of a header or a data area in the message. The encryption algorithm, for example, is a hash algorithm. As such, in case of performing an encryption by using the encryption algorithm, the same encryption algorithm is previously provided.

Next, the message checking 704 transmits the authentication identification information after it is included in a message as an OTP value. The OTP value is a value generated by inputting the user terminal information including a transmission time of the message and MIN, which may be added to a certain area of a header or a data area in the message. In this case, the user terminal 712 generates an OTP value by implementing an OTP generation function, and if the generated OTP value is the same as the OTP value included in the message, is identified that the received message is the authenticated message.

Next, the message checking unit 704 generates the authentication identification information by using a method that records a newly defined specific value for instructing whether the message is authenticated in the PID (Packet Identification) field in the message format.

The PID field is a field that is recorded as a variety of predetermined values according to a characteristic of a message and causes the user terminal 712 to perform an operation corresponding to a value recorded in the relevant PID field. The message checking 704 defines a new specific value in the PID field in which various defined values is recorded for authenticating the message, and then transmit it along with the message for use in authenticating the message. In this case, information for the newly defined specific value in the PID field is provided in advance to the user terminal 712.

The user terminal 712 then checks a recorded value in the PID field of the received message and thus identify whether the received message has been authenticated or not.

Next, the message checking 704 processes the relevant message so that the generated authentication identification information is to be included in the message transmitted by the message provider 700 (S710). After that, the message checking apparatus 704 transmits the message including the authentication identification information to the SMSC 708, MMSC 710 or packet-based message server 711 according to a characteristic of the message (S712) so that the message can be transmitted to the user terminal toward which the message provider 700 requests the transmission of the message.

Figure 15:
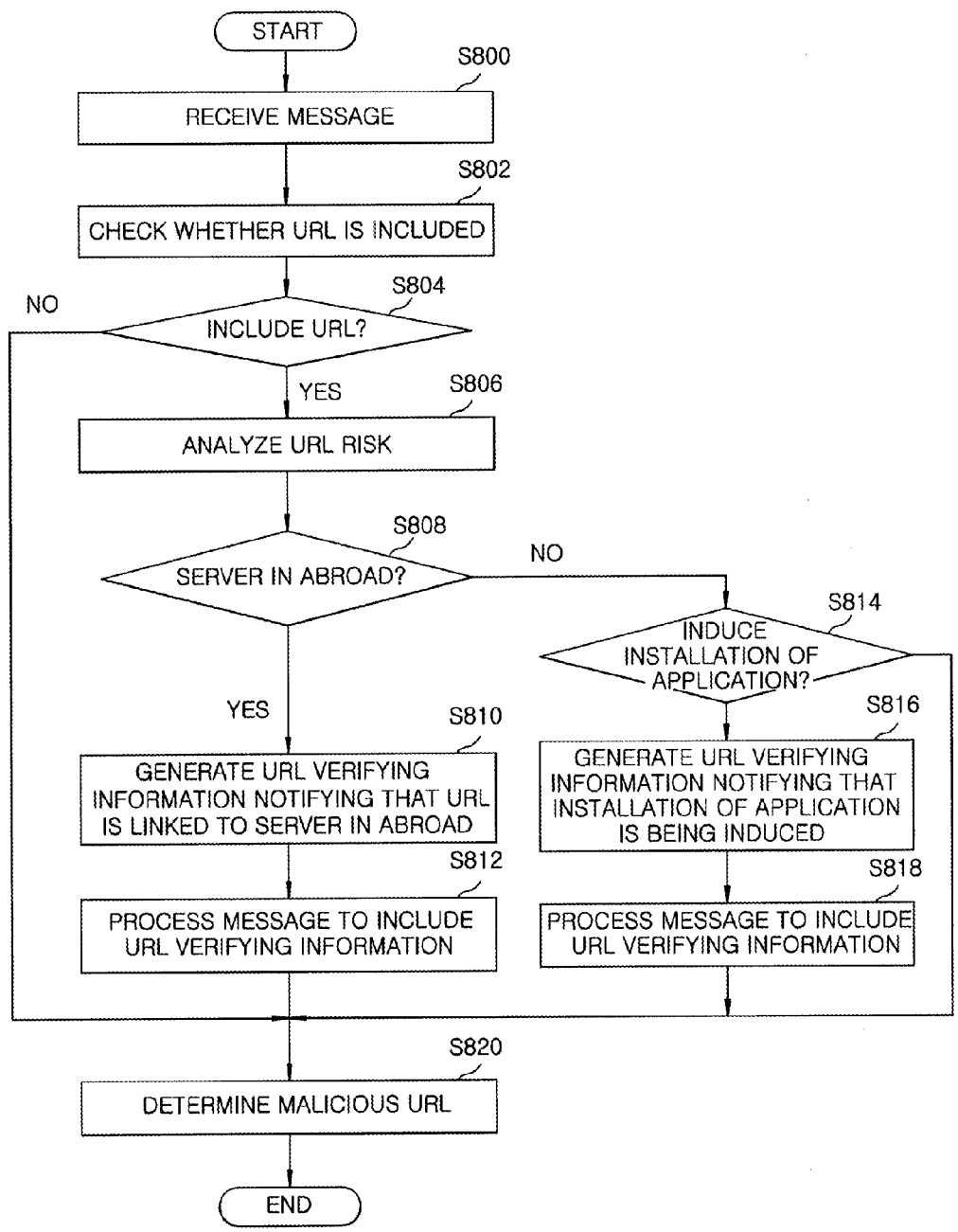
FIG. 15 is a flowchart illustrating a process of displaying a URL risk of a message by a message checking apparatus in accordance with another exemplary embodiment of the present disclosure.

FIG. 15 is a flowchart illustrating a process of transmitting the URL verifying information after including it in a message by the message checking apparatus 704 in accordance with an embodiment of the present disclosure. Hereinafter, the process will be described in detail with reference to FIG. 7 to FIG. 13 and FIG. 15.

Firstly, the message checking apparatus 704 receives various messages being transmitted to the targeted user terminal 712 from a number of companies such as financial services, manufacturers, open markets that is the message provider 700 (S800).

The user terminal 712, for example, includes a mobile communication terminal such as a mobile phone, a smart phone, or the like or a general wire/wireless telephone including a display window capable of receiving a message. In the embodiment of the present disclosure, for the convenience of explanation, a mobile communication terminal such as a mobile phone, a smart phone, or the like will be described as an example.

In this case, among the messages such as an SMS, MMS or packet-based message being transmitted to the user terminal 712 of the users targeted by the message transmitting entity such as the company as describe above, there might be any message including an abnormal URL causing a damage to a user by enabling an application including the malicious URL to be installed or enabling a smishing enterprise in abroad to be connected when the user clicks the abnormal URL.

Accordingly, the message checking apparatus 704 checks whether a URL is included in the message at the time of receiving the message from the message provider 700 (S802).

If it is checked that the URL is included in the message received from the message provider 700 (S804), the message checking apparatus 704 analyzes a risk of the URL included in the message (S806).

In an analysis of a risk of the URL, the message checking apparatus 704, for example, checks whether there exists an inducement of application installment occurring according to a click of URL by performing an operation of direct URL click or checks whether there is a link to a server in abroad, thereby analyzing a risk of the URL and classifying the kinds of risk.

Further, in an analysis of a risk of the URL, for example, the risk of the URL is analyzed by using the URL analysis server 707 separately embodied to analyze a risk of the URL. If the URL is included in the message, the message checking apparatus 704 transmits the relevant URL to the URL analysis server 707 and then causes the URL analysis server 707 to check whether the URL is a risky URL. It is, therefore, possible to check whether the URL is risk or not according to the result from the URL analysis server 707.

That is, if a location of the server accessed through the URL included in the message is analyzed to be in abroad according to the result of the URL risk analysis, the message checking apparatus 704 (S808), the message checking apparatus 704 generates information notifying that the URL is linked to the server located in abroad as the URL verifying information (S810).

Next, the message checking apparatus 704 processes the relevant message so that the generated URL verifying information is to be included in the message transmitted by the message provider 700 (S812), and the message checking apparatus 704 transmits the message including an authentication identification information to the SMSC 708, MMSC 710 or packet-based message server 711 according to a characteristic of the message, which in turn transmit it to the user terminal toward which the message provider 700 requests the transmission of the message. In an inclusion of the generated URL verifying information, the message checking unit 704, for example, adds it to a certain area of a header or a data area of a message.

If or when the URL is analyzed to induce an installation of specific application according to the URL risk analysis result at S814, the message checking unit 704 generates the information notifying that the URL induces an installation of application as URL verifying information (S816).

Next, the message checking apparatus 704 processes the relevant message so that the generated URL verifying information is to be included in the message transmitted by the message provider 700 (S818). Thereafter, the message checking apparatus 704 transmits the message including the authentication identification information to the SMSC 708, MMSC 710 or packet-based message server 711 according to a characteristic of the message (S820) so that the message can be transmitted to the user terminal toward the message provider 700 requests the transmission of the message.

Figure 16:
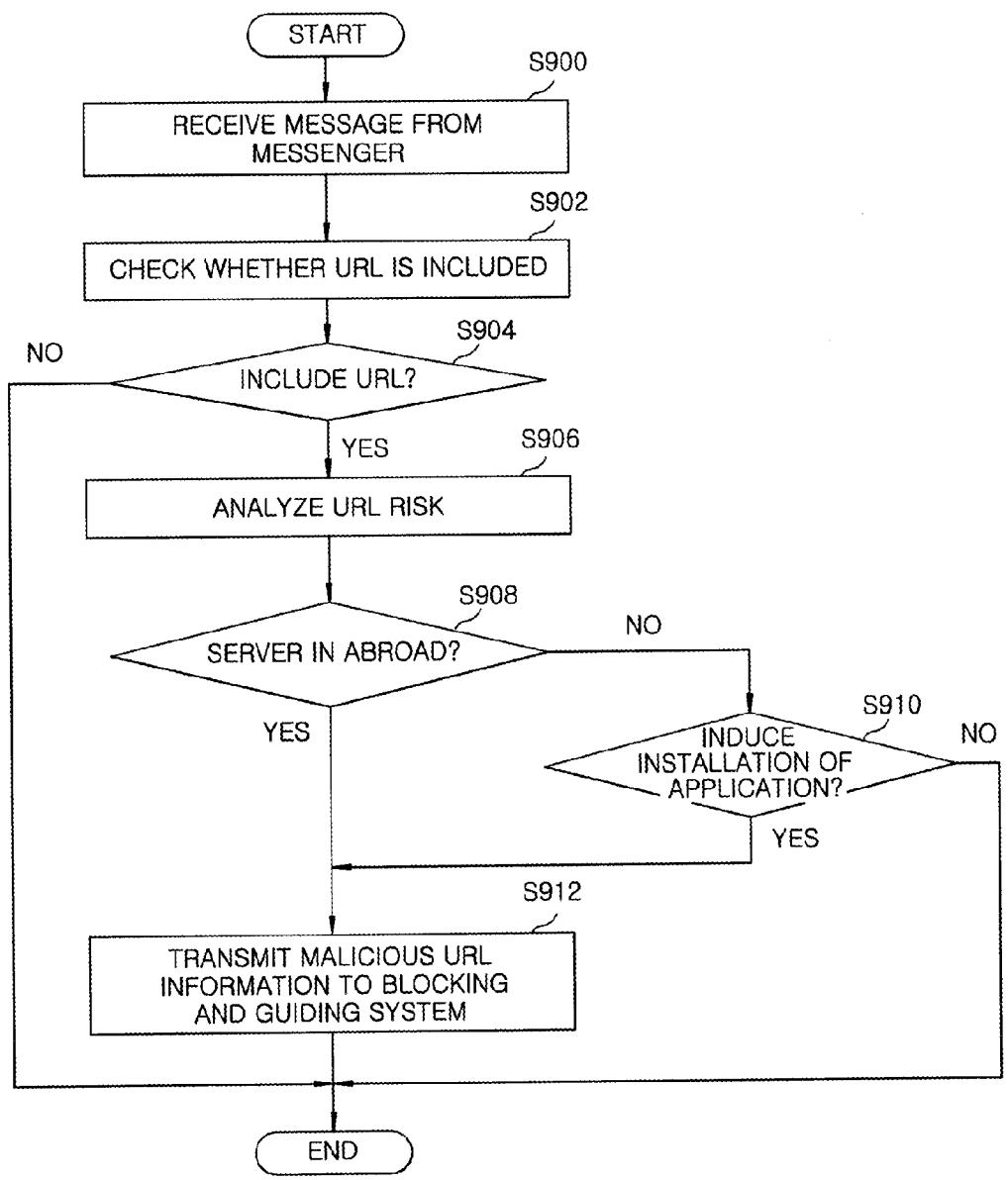
FIG. 16 is a flowchart illustrating a process of notifying information of URL having a risk among the messages being transmitted through a messenger by a message checking apparatus in accordance with another exemplary embodiment of the present disclosure.

FIG. 16 is a flowchart illustrating a process of notifying the URL information being a risk among the messages being transmitted through a messenger by the message checking apparatus in accordance with another embodiment of the present disclosure. Hereinafter, the process will be described in detail with reference to FIG. 7 to FIG. 13 and FIG. 16.

Firstly, the message checking apparatus 704 receives a message transmitted through a messenger using the server 160 besides an SMS or MMS message (S900).

In this case, among the messages received through a messenger, there might be a message, as similar as the SMS or MMS message, which includes a malicious URL enabling an application including a malicious code to be installed or connected to a smishing enterprise in abroad when a user clicks the malicious URL, thereby causing damage to a user.

Accordingly, the message checking apparatus 704 checks whether a URL is included in the message transmitted through a messenger at the time of receiving the message (S902).

If it is checked that the URL is included in a message (S904), the message checking apparatus 704 analyzes a risk of the URL included in the message (S906).

In an analysis of a risk of the URL, the message checking apparatus 704, for example, checks whether there is an inducement of application installment occurring according to a click of the URL by performing an operation of a direct URL click exists or check whether there is a link to a server in abroad, thereby analyzing a risk of the URL and classifying the kinds of risk.

In an analysis of a risk of URL, for example, the URL analysis server 707, which separately configured to analyze a risk of URL, is employed for analyzing the risk of URL. In this case, if the URL is included in the message, the message checking apparatus 704 transmits the relevant URL to the URL analysis server 707 and request for the URL analysis server to check whether the URL is a risky URL. The message checking apparatus 704 also identify whether the URL is risk according to the result from the URL analysis server 707.

That is, as a result of the risk analysis, if a location of a server accessed through URL included in the message is analyzed to be in abroad (S910) or to induce an installation of a specific application (S910), the message checking unit 704 determines the relevant URL as a malicious URL and then transmits information of a malicious URL to the blocking and guiding system 140 (S912).

In response, the transmitted URL information is registered in a harmful site list managed by the blocking and guiding system 140. Accordingly, when a user clicks the relevant URL included in the message, it is blocked an access to the relevant URL by the blocking and guiding system 140, or it is possible to avoid a damage caused by a malicious URL by alerting a risk of the relevant URL.

Figure 17:
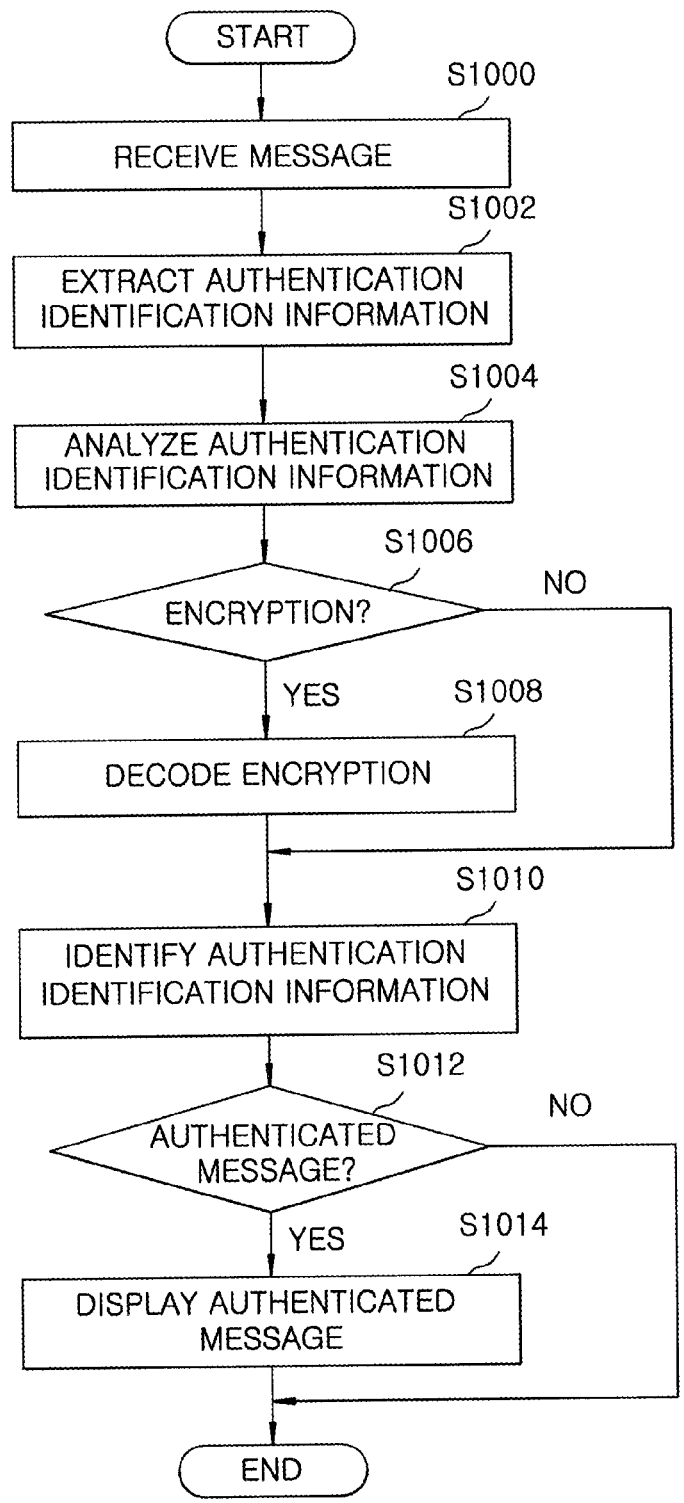
FIG. 17 is a flow chart a process of separately displaying a normal message in a user terminal in accordance with another exemplary embodiment of the present disclosure.

FIG. 17 is a flowchart illustrating a process of separately displaying a normal message by the user terminal 712. Hereinafter, the process will be described in detail with reference to FIG. 7 to FIG. 13 and FIG. 17. Hereinafter, for the convenience of explanation, an operation of a mobile communication terminal such as a mobile phone, a smart phone, or the like which is a user terminal is illustrated as an example, but it is applicable to other kinds of user terminals capable of receiving and displaying of the message.

Firstly, if the message checking apparatus 704 receives a message being transmitted from a number of companies such as financial services, manufacturers, open markets, and others that may be the message provider 700 (S1000), it extracts authentication identification information by identifying whether the authentication identification information is included in the received message as information notifying whether or not the received message is normal (S1002).

Next, the user terminal 712 analyzes the authentication identification information (S1004) and checks whether the authentication identification information is encrypted (S1006).

If the authentication identification information is not encrypted, the user terminal 712 simply checks whether the message is authenticated by reading the relevant authentication identification information in a pre-arranged area of the message (S1010).

As an example, a case exemplifying that the authentication identification information is not encrypted is, for example, a case that information regarding whether the message is authenticated is generated as simple authentication identification information of true or false by the message checking apparatus 704, which is not authenticated, and it is added to a certain area of a message header or a data are in the message. Another exemplified case is a case that information regarding whether the message is authenticated is recorded by substituting a pre-determined specific value in a PID field of the message by the message checking apparatus 704.

Accordingly, the user terminal 712 checks whether the relevant authentication identification information is authenticated by reading it in a pre-arranged area, or check whether the predetermined specific value is recorded in PID field for identifying the authentication.

However, if it is checked that the authentication identification information is encrypted at S1006, the user terminal 712 decodes an encryption of the authentication identification information (S1008) and then identifies the authentication identification information (S1010).

As an example, a case exemplifying that the authentication identification information is encrypted is a case that the authentication identification information is encrypted through the use of a predetermined encryption algorithm such as a hash algorithm based on user terminal information of the user terminal 712 to which the message will be transmitted, for example, MIN (Mobile Identification Number) information in order for a security of the authentication identification information and the encrypted authentication identification information is then added to a certain area of a header or a data area in the message.

Another exemplified case is a case that the message checking 704 transmits the authentication identification information after the authentication identification information is included in a message as an OTP value by. The OTP value is a value generated by inputting user terminal information of a transmission time of the message and MIN, which is added to a certain area of a header or a data area in the message and then be transmitted.

Accordingly, if or when the authentication identification information is encrypted with an encryption algorithm such as a hash algorithm, the user terminal 712 extracts the encrypted authentication identification information in the pre-arranged area of the message, decodes the encryption by using the same encryption algorithm used when the authentication identification information is encrypted and the user terminal information including the MIM information, and then identifies the authentication identification information.

In addition, when the authentication identification information is transmitted as an OTP value, the user terminal 712 generates an OTP value by implementing an OTP generation function, and if the generated OTP value is the same as the OTP value included in the message, it is identified that the received message is the authenticated message.

In this regard, the same OTP generator as the OTP generator used to generate the OTP value by the message checking apparatus 704 is equipped with the user terminal 712. If or when the authentication identification information as the OTP value is transmitted together with a message, the message checking apparatus 704 generates the OTP value by inputting a message transmission time that is the same parameter used as an input value of the OTP generator and the user terminal information and then compare the generated OTP value with the OTP value included in the message.

The authentication identification information identified through the above authentication process is information in which whether the message is authenticated is recorded, for example, as a value of a true or a false, where the true means an authenticated message and the false means an unauthenticated message.

Accordingly, the user terminal 712 checks whether the relevant message is an authenticated message by identifying the authentication identification information (S1012); and if not, it is processed like the general case.

However, if the message is an authenticated message, the user terminal 712 displays a company logo, an authentication mark, or an authentication character representing the authenticated message with a receiving alarm of the message on the screen, or notifies it by using various methods such as outputting a voice (S1014) so that a user checks whether the currently received message is authenticated.

In this case, if the authenticated message is received, as shown in FIG. 10, FIG. 11 or FIG. 12, the user terminal 712, for example, displays a predetermined company logo 400 or an authentication mark 450 on a message condensed window, also display an authentication character 500 such as "it is authenticated message" as a popup message, and also display the authentication mark 450 and the authentication character 500 at the same time.

Accordingly, the user terminal 712 displays the message authenticated to the safe message among a number of SMS, MMS, or packet-based messages received thereto, using various methods, enabling the user to easily distinguish an authenticated message from an unauthenticated message. Therefore, it is prevented that the user doubts the authenticated message as a spam message and does not check it.

Figure 18:
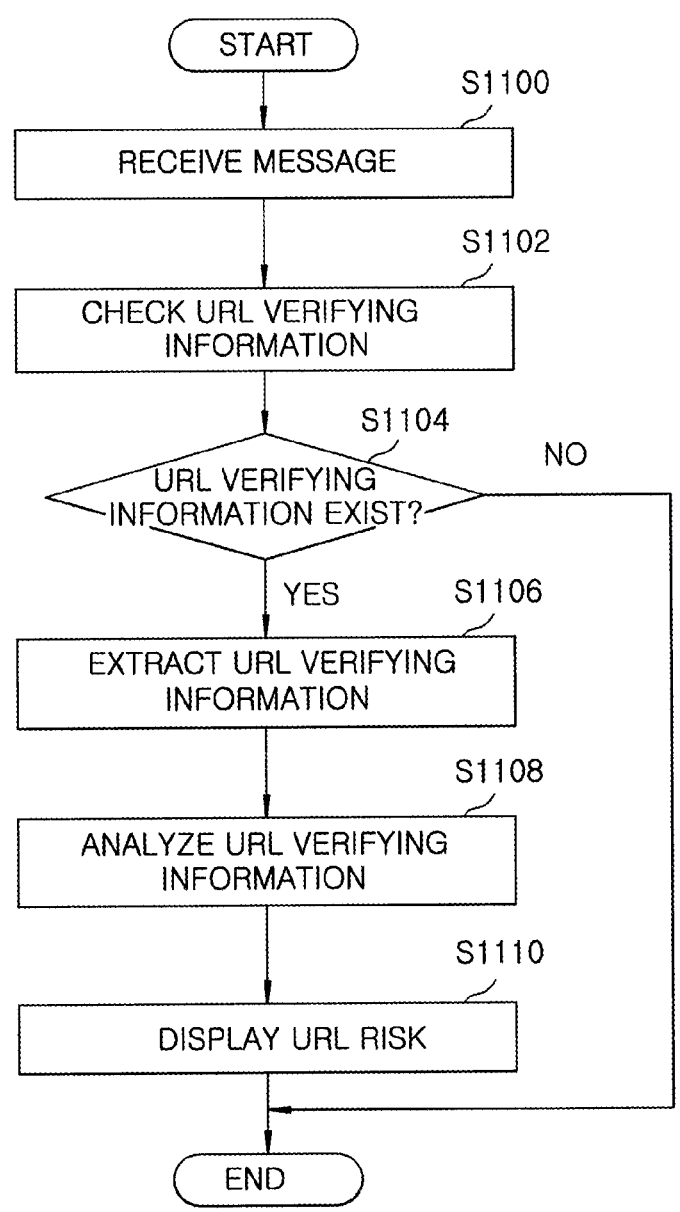
FIG. 18 is a flowchart illustrating a process of separately displaying an abnormal message in a user terminal in accordance with another exemplary embodiment of the present disclosure.

FIG. 18 is a flowchart illustrating a process of separately displaying an abnormal message by a user terminal 712 in accordance with another embodiment of the present disclosure. Hereinafter, the process will be described in detail with reference to FIG. 7 to FIG. 14 and FIG. 16.

Firstly, when the user terminal 712 receives a message transmitted from a number of companies such as financial services, manufacturers, open markets, or the like through the communication network (S1100), it checks whether URL verifying information notifying whether the received message is normal is included in the received message (S1102).

If it is checked that the URL verifying information is included in the received message (S1104), the user terminal 712 extracts the URL verifying information included in a predetermined certain area such as a header or a data area in the message (S1106).

Next, the user terminal 712 analyzes the extracted URL verifying information and identifies a risk against a URL included in a message (S1108). After that, the user terminal 712 displays a risk of the URL included in the message for enhancing a user's cognitive ability by using various methods so that the user easily recognize the risk of the URL (S1110).

In displaying a risk of the URL based on the URL verifying information, if it is identified that a server being accessed through the URL included in the message received by using the URL verifying information is located in abroad, as shown in the reference numeral 460 of FIG. 13, the user terminal 712 displays information notifying that the relevant URL has an access to the server in abroad as a character or a picture on the screen or outputs a sound so that the user recognizes a risk of the URL.

If the URL included in the message received through the URL verifying information is identified to induce a specific application, as shown in the reference numeral 462 of FIG. 13, the user terminal 712 displays information notifying an inducement of the specific application by the relevant URL as a character or a picture on the screen or outputs a sound so that the user recognizes a risk of the URL.

As described above, in a method for checking a message in accordance with the present disclosure, it is possible to avoid a damage caused by an abnormal message by checking whether various messages being transmitted to a user terminal is normal before transmitting them to the user terminal, inserting additional information regarding whether the message is normal into the relevant message and transmitting the relevant message including the additional information, and then distinguishing a normal message from an unauthenticated message including a malicious URL or transmitted from the message provider who is not authenticated.

Further, in a message checking method, it is possible to avoid a damage due to a malicious URL by checking whether the URL is a malicious URL inducing an installation of a malicious application, determining the message including the malicious URL as an abnormal message if the URL is the malicious URL and blocking not to be transmitted to a user terminal, or alerting a risk of the malicious URL. Further, it is possible to fundamentally and preemptively block a malicious application propagating through a message by blocking a message including a malicious URL in a transmission server through a pre-filtering before transmission of the message including the malicious URL. In addition, it is possible to easily collect a malicious application sample relative to a company providing vaccine programs by suggesting a model that a communication service provider itself checks whether an application downloaded through a malicious URL is malicious; therefore, in terms of a counteraction against the malicious application, it is also an advantage to create an independent business model of the communication service provider.

Moreover, it is also possible to avoid a damage by providing information of a malicious URL to blocking and guiding system after checking whether a URL included in a message is malicious in case where the message is transmitted to a user terminal through other route such as a messenger in communication network, besides a message such as SMS or MMS, and even though a user clicks the malicious URL included in the message, by blocking access to the malicious URL and alerting a user through the blocking and guiding system.

The method in accordance with an embodiment of the present disclosure is carried out by at least a processor.

According to various embodiments of the present disclosure of a message checking method, there is advantageous effect to avoid a damage caused by an abnormal message by checking whether various messages being transmitted to a user terminal are normal before transmitting them to the user terminal, inserting additional information regarding whether the message is normal into the relevant message and transmitting the relevant message including the additional information to distinguish a normal message from messages including a malicious URL or unnecessary messages being transmitted from the message provider who is not authenticated.

Further, according to various embodiments of the present disclosure of a message checking method, it is advantageous effect to avoid a damage caused by malicious URL by checking whether the URL is a malicious URL inducing an installation of malicious application, determining the message including the malicious URL as an abnormal message if or when the URL is the malicious URL and blocking not to be transmitted to a user terminal, or alerting a risk of the malicious URL.

Further, according to various embodiments of the present disclosure of a message checking method, it is advantageous effect to fundamentally and preemptively block malicious application propagating through a message by blocking a message including malicious URL in a transmission server through pre-filtering before transmission of the message including the malicious URL.

Further, according to various embodiments of the present disclosure of a message checking method, it is advantageous effect to easily collect malicious application sample relative to a company providing vaccine programs by suggesting a model that a communication service provider itself checks whether an application downloaded through malicious URL is malicious; therefore, in terms of a counteraction against the malicious application, it is also advantageous effect to create an independent business model of the communication service provider.

In addition, according to various embodiments of the present disclosure of a message checking method, it is also advantageous to avoid a damage by providing information of malicious URL to blocking and guiding system after checking whether a URL included in a message is malicious in case where is transmitted to a user terminal through other route such as a messenger in communication network, besides a message such as SMS or MMS, and even though a user clicks the malicious URL included in the message, by blocking access to the malicious URL and alerting a user through the blocking and guiding system.

In the description above, although all of the components of the embodiments of the present disclosure have been explained as assembled or operatively connected as a unit, the present disclosure is not intended to limit itself to such embodiments. Rather, within the objective scope of the claimed invention, the respective components is able to be selectively and operatively combined in any numbers. Every one of the components is also implemented by itself in hardware while the respective ones can be combined in part or as a whole selectively and implemented in a computer program having program modules for executing functions of the hardware equivalents. Codes or code segments to constitute such a program is easily deduced by a person skilled in the art. The computer program is stored in non-transitory computer readable recording medium, which in operation can realize some embodiments of the present disclosure. Examples of the non-transitory computer readable recording medium include magnetic recording media, such as a hard disk, a floppy disk, and a magnetic tape, and optical recording media, such as a compact disk read only memory (CD-ROM) and a digital video disk (DVD), magneto-optical media, such as a floptical disk, and hardware devices that are specially configured to store and execute program instructions, such as a ROM, a random access memory (RAM), and a flash memory.

In addition, terms like 'include', 'comprise', and 'have' should be interpreted in default as inclusive or open rather than exclusive or closed unless expressly defined to the contrary. All the terms that are technical, scientific or otherwise agree with the meanings as understood by a person of ordinary skill in the art unless defined to the contrary. Common terms as found in dictionaries should be interpreted in the context of the related technical writings not too ideally or impractically unless the present disclosure expressly defines them so.

Although exemplary embodiments of the present disclosure have been described for illustrative purposes, those of ordinary skill in the art will appreciate that various modifications, additions and substitutions are possible, without departing from the spirit and scope of the claimed invention. Specific terms used in this disclosure and drawings are used for illustrative purposes and not to be considered as limitations of the present disclosure. Therefore, exemplary embodiments of the present disclosure have not been described for limiting purposes. Accordingly, the scope of the claimed invention is not to be limited by the above embodiments but by the claims and the equivalents thereof.

What is claimed is:

1. A message checking apparatus comprising one or more processors, the message checking apparatus comprising:
   a uniform resource locator(URL) extracting unit, implemented by the one or more processors and/or application-specific integrated circuits (ASICs), configured to identify, when a message is received, whether the message is securely authorized to be sent to a user terminal device by
      checking a URL included in the message and
      extracting the URL from the message when the URL is checked to be included in the message;
   a communication unit, implemented by the one or more processors and/or application-specific integrated circuits (ASICs), configured to download an application using the URL; and
   an authorization/application program interface(API) verifying unit, implemented by the one or more processors and/or application-specific integrated circuits (ASICs), configured to verify the message for secure authorization whether to send the message to the user terminal by
      checking whether an authorization or API having a security risk is included in the application to be downloaded through the communication unit, and
      determining whether the message including the URL is securely authorized,
   wherein the authorization/API verifying unit is configured to verify the message for secure authorization whether to send the message to the user terminal by
      analyzing an execution file of the application by comparing the execution file of the application with signature information in previously checked applications,
      checking whether the authorization having a security risk exists among authorization information for the application to determine whether to send the message to the user terminal.

2. The message checking apparatus of claim 1, further comprising:
   a pre-filtering unit, implemented by the one or more processors and/or application-specific integrated circuits (ASICs), configured to
      store list information of URL having been determined to be malicious as filtering information,
      check whether the extracted URL is in the filtering information before downloading the application through the communication unit, and
      block the extracted URL if the extracted URL is in the filtering information.

3. The message checking apparatus of claim 1, wherein when the URL is determined to be malicious, the message checking apparatus provides the URL to a blocking and guiding system that serves so that the blocking and guiding system enables to block an access of a user terminal device to a site having the URL.

4. The message checking apparatus of claim 1, further comprising:
   a processing unit, implemented by the one or more processors and/or application-specific integrated circuits (ASICs), configured to
      generate URL verifying information indicating that the URL is malicious, and
      process the URL verifying information to be included in the message, when the URL is determined to be malicious.

5. The message checking apparatus of claim 1, further comprising:
   a dynamic analyzing unit, implemented by the one or more processors and/or application-specific integrated circuits (ASICs), configured to determine whether the application is malicious, after executing the application downloaded through the communication unit on an emulator based on an analysis on an execution result of the application.

6. The message checking apparatus of claim 1, wherein the authorization/API verifying unit is configured to decompile the execution file of the application, and check whether API for performing the authorization is executed to determine whether the URL is malicious.

7. A method performed by a message checking apparatus including one or more processors and/or application-specific integrated circuits (ASICs) to implement the method comprising:
   identifying, when a message is received, whether the message is securely authorized to be sent to a user terminal device by
      checking whether a uniform resource locator (URL) is included in the message to extract the URL;
   downloading an application using the URL; and
   verifying the message for secure authorization whether to send the message to the user terminal by
      checking whether an authorization or application program interface (API) having a security risk is included in the downloaded application, and
      determining whether the message including the URL is securely authorized,
   wherein the message for secure authorization whether to send the message to the user terminal is verified by
      analyzing an execution file of the application by comparing the execution file of the application with signature information in previously checked applications,
      checking whether the authorization having a security risk exists among authorization information for the application to determine whether to send the message to the user terminal.

8. The message checking method of claim 7, further comprising:
   generating URL verifying information indicating that the URL is malicious when the URL is determined to be malicious; and processing the URL verifying information to be included in the message.

9. The message checking method of claim 7, further comprising:
executing the downloaded application on an emulator; and
determining by analyzing an execution an execution result of the application whether the application is malicious.

10. The message checking method of claim 7, wherein said checking whether the authorization or API having a security risk is included in the downloaded application comprises:
checking whether the API for performing the authorization is executed by decompiling the execution file of the application.

11. A message checking apparatus comprising at least one processor, the message checking apparatus comprising:
a communication unit, implemented by the one or more processors and/or application-specific integrated circuits (ASICs), configured to receive a message transmitted from a message provider;
an authenticating unit, implemented by the one or more processors and/or application-specific integrated circuits (ASICs), configured to check whether the message is normal by
analyzing, after executing an application downloaded through the communication unit, an execution file of the application, and
comparing the execution file of the application with signature information in previously checked applications; and
a processing unit, implemented by the one or more processors and/or application-specific integrated circuits (ASICs), configured to include in the message information regarding whether the message is normal based on a result of the check,
wherein the authenticating unit is further configured to verify the message for secure authorization whether to send the message to the user terminal by
extracting authentication identifier information of the message provider, and
checking whether the authentication identifier information is of authenticating identifier information previously assigned to providers who provide normal messages to determine whether the message is normal.

12. The message checking apparatus of claim 11, wherein the authenticating unit, when the message includes an uniform resource locator (URL) therein, is configured to
check a risk of the URL and
determine the message to be an abnormal message when a server to be accessed using the URL is identified to be a server located abroad or a specific application is installed upon a click of the URL.

13. The message checking apparatus of claim 11, wherein the processing unit is further configured to encrypt information regarding whether the message is normal using a predetermined encryption algorithm based on terminal information of a user terminal to which the message is to be transmitted, and
include the encrypted information in the message.

14. The message checking apparatus of claim 11, wherein the processing unit is further configured to record information on whether the message is normal in
a packet identification (PID) field of the message, or
a header or a data area of the message.

15. A message checking method implemented by the processor of the message checking apparatus of claim 11, the processor configured to implement the method comprising:
receiving a message transmitted from a message provider;
checking whether the message is normal by
analyzing, after executing an application downloaded through the communication unit, an execution file of the application, and
comparing the execution file of the application with signature information in previously checked applications; and
including information regarding whether the message is normal to be included in the message based on a result of said checking,
wherein the message checking method further comprises:
extracting authentication identifier information of the message provider, and
checking whether the authentication identifier information is of authenticating identifier information previously assigned to providers who provide normal messages to determine whether the message is normal.

16. The message checking method of claim 15, wherein the checking whether the message is normal comprising:
extracting authenticating identifier information of the message provider;
checking whether the authenticating identifier information is of authenticating identifier information previously assigned to providers who provide normal messages; and
determining the message is normal when the authenticating identifier information is identified as being of the authenticating identifier information previously assigned to the providers who provide the normal messages.

17. The message checking method of claim 15, wherein the checking whether the message is normal, comprising:
checking, when the message includes an uniform resource locator (URL) therein, a risk of the URL; and
determining the message to be an abnormal message when a server to be accessed through the URL is identified to be a server located abroad or a specific application is installed upon a click of the URL.

* * * * *